United States Patent
Adleman

(10) Patent No.: US 9,621,552 B2
(45) Date of Patent: Apr. 11, 2017

(54) METHODS AND SYSTEMS FOR USING DEEP-STRINGS IN COMPUTATION AND COMMUNICATION

(71) Applicant: ELEMENTUM, LLC, Alexandria, VA (US)

(72) Inventor: Leonard M. Adleman, Northridge, CA (US)

(73) Assignee: ELEMENTUM, LLC, Alexandria, VA (US)

( * ) Notice: Subject to any disclaimer, the term of this patent is extended or adjusted under 35 U.S.C. 154(b) by 276 days.

(21) Appl. No.: 14/582,874

(22) Filed: Dec. 24, 2014

(65) Prior Publication Data

US 2016/0359852 A1     Dec. 8, 2016

Related U.S. Application Data

(60) Provisional application No. 61/924,428, filed on Jan. 7, 2014.

(51) Int. Cl.
| | |
|---|---|
| G06F 21/00 | (2013.01) |
| H04L 9/32 | (2006.01) |
| H04L 29/06 | (2006.01) |
| H04L 9/30 | (2006.01) |
| H04L 9/00 | (2006.01) |

(52) U.S. Cl.
CPC ........ *H04L 63/0876* (2013.01); *H04L 9/3066* (2013.01); *H04L 9/3247* (2013.01); *H04L 63/0442* (2013.01); *H04L 63/061* (2013.01)

(58) Field of Classification Search
None
See application file for complete search history.

(56) References Cited

U.S. PATENT DOCUMENTS

| 4,405,829 A | 9/1983 | Rivest et al. |
| 4,759,063 A | 7/1988 | Chaum |
| 9,319,223 B2 * | 4/2016 | Nix .................... G06F 21/35 |
| 2008/0298584 A1 * | 12/2008 | Ahmed ............... H04L 9/0662 |
| | | 380/46 |
| 2010/0262842 A1 * | 10/2010 | Kansal .................. G06F 1/32 |
| | | 713/300 |

(Continued)

OTHER PUBLICATIONS

Adleman, Leonard M., "Time, Space and Randomness", MIT/LCS/TM-131, Mar.-Apr. 1979, available at http://www,usc.edu/molecularscience/timespacerand.pdf.

(Continued)

*Primary Examiner* — Shin-Hon Chen
(74) *Attorney, Agent, or Firm* — Nixon & Vanderhye P.C.

(57) ABSTRACT

Computer and communications systems and methods are provided in which a first computing system sends a second computing system a message and an associated deep-string and the second computing system applies a key of a cryptographic system or a one-way function to the deep-string to determine the deep-string's deep-string-depth. The second computing device then uses the determined deep-string-depth in determining subsequent behavior regarding the message. In some environments, a third computing device may generate and provide deep-strings of various deep-string-depths to the first computing device to ensure more favorable behavior of the second computing device.

94 Claims, 28 Drawing Sheets

(56) References Cited

U.S. PATENT DOCUMENTS

2011/0206201 A1* 8/2011 Garcia Morchon .. H04L 9/0838
380/44
2015/0106616 A1* 4/2015 Nix ................... H04W 52/0235
713/156

OTHER PUBLICATIONS

Adleman, Leonard M,. "The Rarest Things in the Universe", Azimuth, Online Guest Post dated Jan. 27, 2014, available at http://johncarlosbaez.wordpress.com/2014/01/27/the_rarest-things-in-the-universe/, pp. 1-4.
Wikipedia, "Diffie-Hellman key exchange", http://en.wikipedia.org/wiki/Diffie-Hellman_key_exchange, accessed on Oct. 20, 2014.
Wikipedia, "Secret Sharing", http://en.wikipedia.org/wiki/Secret_sharing, accessed on Oct. 20, 2014.
Bellovin, Rebecca, "Cryptography: Authentication, Blind Signatures, and Digital Cash", available online at http://math.stanford.edu/~rmbellov/writings/chaum.pdf, accessed Oct. 20, 2014.
Encryptek,"Radium PCIe Card", http:// http://www.encryptek.net/radium_pcie_card.html, accessed on Oct. 20, 2014.
Childers, "Factorization of a 1061-bit number by the Special Number Field Sieve," Cryptology ePrint Archive, Report 2012/444, 2012, http://eprint.iacr.org/.
Rivest et al., "A Method for Obtaining Digital Signatures and Public-Key Cryptosystems", Communications of the ACM, vol. 21, Issue 2, pp. 120-126, Feb. 1978.

* cited by examiner ance with one or more embodiments.

METHODS AND SYSTEMS FOR USING DEEP-STRINGS IN COMPUTATION AND COMMUNICATION

CROSS-REFERENCE TO RELATED APPLICATION

This application claims the benefit of U.S. Provisional Patent Application No. 61/924,428 filed on Jan. 7, 2014, which is hereby incorporated by reference in its entirety.

FIELD

The subject matter below relates generally to the practical use of deep-strings in computation and communication systems. Deep-strings will be defined below; however, informally, a deep-string is a data string from which by the application of a cryptographic key or a one-way function a quantity herein called the deep-string-depth may be calculated.

More particularly, the subject matter relates to computing and communications systems in which a first entity (for example, a computing system) sends a second entity a deep-string and the second entity applies a key of a cryptographic system or a one-way function to the deep-string to determine the deep-string's deep-string-depth. The second entity then uses the determined deep-string-depth in determining subsequent behavior. In addition, in some embodiments the second entity or a third entity may generate and provide (e.g. by selling) deep-strings of various deep-string-depths to the first entity who may use them to ensure more favorable behavior of the second entity.

BACKGROUND

Electronic message systems are frequently exploited by various entities, including advertisers, identity thieves, and hackers to distribute messages that are unsolicited, unwanted and/or dangerous. Among the best known examples of such exploitation is the distribution by advertisers of spam. Often such messages are simultaneously distributed to a large number of entities. In the case of spam messages containing advertising, this distribution occurs at the expense of and without compensation to the electronic message system operator or the message receiver. For example, in email systems, substantial computing resources and wealth are expended in attempting to handle spam by techniques such as filtering based on the presence of selected keywords, selected email addresses, etc. The same phenomena can be found in other messaging systems, such as text messaging systems, and voicemail systems.

Electronic resources are frequently exploited by various entities including identity thieves, hackers, competitors, and commercial or governmental entities engaged in spying or espionage. Such exploitation may result in, among other things, destruction of information, unauthorized disclosure of information, disruption of service, theft and loss of productivity. The controller of an electronic resource may expend substantial computing resources and wealth on various security policies and methods (e.g. passwords, firewalls) to stop unauthorized access.

Conventional systems for paying for online purchases include paying via an electronic bank account or other such account. However, such methods are often slow by today's internet standards and often involve payments to a third party for processing the purchase. A faster, more transparent and less costly system would be desirable.

DETAILED DESCRIPTION

Figure 1:
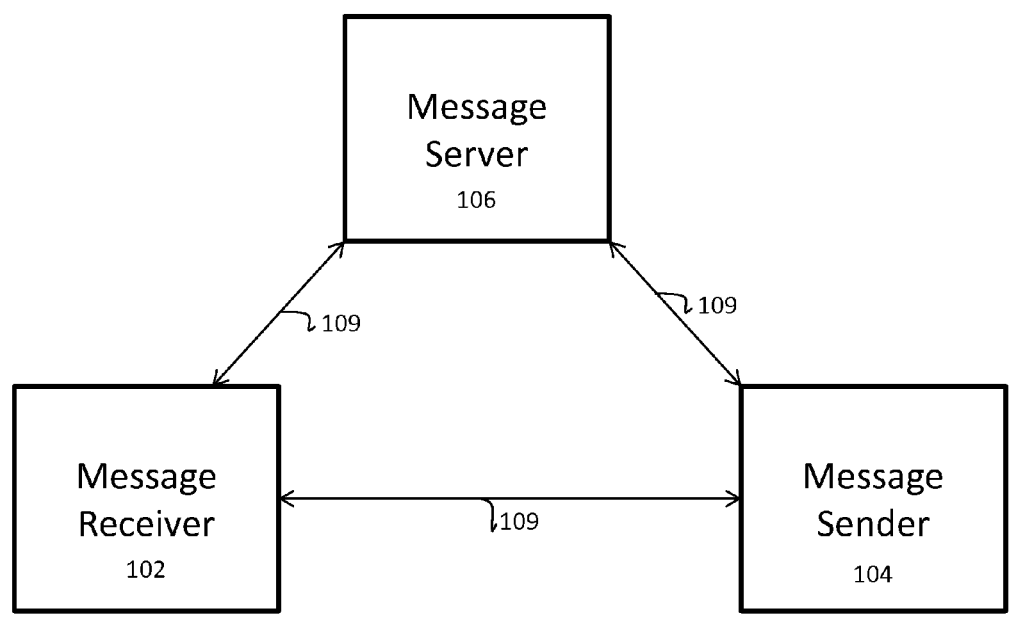
FIG. 1 is a high-level block diagram of an electronic message system that includes a message server, message sender and message receiver, according to one or more embodiments.

Deep-strings and their underlying theory are described in Adleman; "Time, Space and Randomness," Technical Report, Laboratory for Computer Science, Massachusetts Institute of Technology, MIT/LCS/TM-131, March-April 1979 (also available at www.usc.edu/molecular-science/timespacerand.pdf) and Adleman, "The Rarest Thing in the Universe," (Guest post on Azimuth blog edited by John Baez: http://johncarlosbaez.wordpress.com/2014/01/27/the-rarest-things-in-the-universe/) which are both herein incorporated by reference in their entireties.

Systems that use deep-strings are referred to as deep-systems.

A public-key cryptosystem is sufficient to build a deep-system and every public-key cryptosystem can be used to build deep-systems. Deep-systems built using a public-key cryptosystem are referred to as dual-deep-systems. Deep-strings of a dual-deep-system are referred to as dual-strings.

To create a dual-deep-system using a public-key cryptosystem one proceeds as follows: one generates a secret key, S, and a public key, P, of the public key cryptosystem; one defines a series of disjoint sets, called the depth-series, S1, S2, . . . , Sw, of data strings; and one declares that a data string, M, is a dual-deep-string of depth d if encrypting M with the public key, P, produces a data string in the set Sd.

A dual-deep-string of depth d may be generated by using an ordinary deep-string generator or a special deep-string generator. The special deep-string generator requires less time, energy and expense than the ordinary deep-string generator. However, the special deep-string generator requires access to the secret key.

In the ordinary deep-string generator, an entity with access to the public key P generates a string M at random and encrypts it using the public key P to produce a data-string Q. If Q is in Sd, then M is the desired dual-deep-string of depth d and the entity stops the process. If Q is not in Sd, then M is not the desired dual-deep-string of depth d and the entity repeats the process.

In the special deep-string generator, an entity with access to the secret key S generates a string E in Sd. E is encrypted using the secret key S. The string M that results from this encryption will have depth d (this follows from properties of a public key cryptosystem such as Rivest-Shamir-Adleman).

Independent of how a dual-deep string, M, is generated, the deep-string-depth of M, may be calculated by an entity with access to the public key P, using little time, energy and expense. The entity encrypts M using the public key P to produce a data-string Q. The entity then checks if Q is in S1, if Q is in S2, etc. until a d is found such that Q is in Sd, then the deep-string-depth of M is d. If no such d is found, then, by default, the deep-string-depth of M is 0.

A non-limiting example of a dual-deep-system would be one which uses 2048-bit RSA public key cryptography keys, and one defines S1 to be the set of 2048-bit strings with exactly 1 leading zero, S2 to be the set of 2048-bit strings with exactly 2 leading zeros, S3 to be the set of 2048-bit strings with exactly 3 leading zeros, etc. Then a dual-deep-string of depth d can be generated by an ordinary deep-string generator or a special deep-string generator.

Using an ordinary deep-string generator, an entity with access to the public key P generates a string M at random and encrypts it using the public key P to produce a data-string Q. If Q has exactly d leading zeros, then M is the desired dual-deep-string of depth d, and the entity terminates the process. If Q does not have exactly d leading zeros, then M is not the desired dual-deep-string of depth d and the entity repeats the process. The expected number of encryptions needed until a dual-deep-string of depth d is generated is $2^{d+1}$. For example a dual-deep-string of depth 10 could be created using 2048 encryptions, but one of depth 40 would use 2199023255552 encryptions. Hence, when using the ordinary deep-string generator, the time, energy and expense of producing a dual-deep-string of desired depth grows rapidly with the increasing depth.

Using a special deep-string generator, an entity with access to the secret key S generates a string E with exactly d leading zeros. E is then encrypted using the secret key S. As noted above, the string M that results from this encryption will have depth d. Hence using the special deep-string generator, the deep-string of desired depth can be produced with little time, energy, and expense.

According to some embodiments, instead of using a key of a public key cryptosystem, a one-way function may be used to build a deep-system. A one-way function is sufficient to build a deep-system and every one-way function can be used to build deep-systems. A deep-system built using a one-way function is referred to as a singular-deep-system. Deep-strings of a singular-deep-system are referred to as singular-strings.

To create a singular-deep-system using a one-way function one proceeds as follows: one chooses a one-way function, F; one defines a series of disjoint sets, called the depth-series, S1, S2, . . . , Sw, of data strings; and one declares that a data string, M, is a singular-deep-string of depth d if F(M) is a data string in the set Sd. A singular-deep-string of depth d may be generated by using an ordinary deep-string generator.

In the ordinary deep-string generator, an entity with access to an algorithm for computing F can generate a string M at random and calculate F(M). If F(M) is in Sd, then M is the desired singular-deep-string of depth d and the entity stops the process. If F(M) is not in Sd, then M is not the desired singular-deep-string of depth d and the entity repeats the process.

It should be noted that if the one-way function F is not derived from a public-key cryptosystem, then there is no secret key, and unlike the case with dual-deep-systems, there is no known special deep-string generator technique.

The deep-string-depth of a string M, may be calculated by an entity with access to an algorithm for computing F, using little time, energy and expense. The entity calculates F(M). The entity then checks if F(M) is in S1, if F(M) is in S2, etc. until a d is found such that F(M) is in Sd, then the deep-string-depth of M is d. If no such d is found, then, by default, the deep-string-depth of M is 0.

A non-limiting example of a singular-deep-system is one in which the one way function F is discrete exponentiation base 2 with respect to a 2048 bit prime Q, and one defines depth-series S1 to be the set of 2048-bit strings with exactly 1 leading zero, depth-series S2 to be the set of 2048-bit strings with exactly 2 leading zeros, depth-series S3 to be the set of 2048-bit strings with exactly 3 leading zeros, etc.

In the above singular-deep-system, a singular-deep-string of depth d, for example, can be generated as follows.

Using an ordinary deep-string generator, an entity with access to Q generates a string M at random and calculates F(M), the least non-negative residue of $2^M$ Modulo Q. If F(M) has exactly d leading zeros, then M is the desired singular-deep-string of depth d and the entity stops the process. If F(M) does not have exactly d leading zeros, then M is not the desired singular-deep-string of depth d and the entity repeats the process. The expected number of modular exponentiations needed until a singular-deep-string of depth d is generated is $2^{d+1}$. For example a singular-deep-string of depth 10 could be created using 2048 modular exponentiations, but one of depth 40 would use 2199023255552 modular exponentiations. Hence using this method, the time, energy and expense of producing a singular-deep-string of desired depth grows rapidly with the increasing depth.

It should be noted in particular that this one-way function, F, is not derived from a public-key cryptosystem, and there is no secret key and no known technique to produce deep-strings of desired depth with little time, energy and expense.

In general dual-deep-systems may be used wherever singular-deep-systems can be used; however, dual-deep-systems may be used in some settings where singular-deep-systems cannot.

In the above examples, Sd was defined as the set of strings with exactly d leading zeros. However, this is one of many choices. For example, in some embodiments, a number m may be chosen and Sd defined to be the set of strings W such that when written base m, W has exactly d trailing ones. In another embodiment, Sd may be defined as the set of strings that in ascii begin with the first d words in the $d^{th}$ paragraph of the U.S. Constitution. In some embodiments one may define S0 to be the set of all strings that are not in Sd for some d one or greater. In this case, S0 is the set of strings of zero deep-string-depth. In some embodiments S0 may be processed as a string which required no effort (e.g. in energy and/or time and/or dollars) by a computing system to produce.

As used herein the "deep-string-depth" of a deep-string A is a number, d, such that d can be computed from A with little effort (e.g. in energy and/or time and/or monetary cost) by a computing device with access to public information, but generating a deep-string A with deep-string-depth d from d may require significant (e.g. prohibitive) effort (e.g. in energy and/or time and/or monetary cost) by a computing device without access to secret information.

As used herein, the energy required by a computing device refers to the amount of energy (e.g. in kilowatt-hours) that a standard computer (e.g. Apple®—Macbook Air®) would use to perform the computation or generation. As used herein, the time required by a computing device refers to the amount of time (e.g. in seconds) that a standard computer (e.g. Apple®—Macbook Air®) would use to perform the computation or generation. As used herein, the monetary cost required by a computing device refers to the cost (e.g. in dollars) incurred (e.g. in cost of energy and cost in time and cost in wear and tear) when using a standard computer (e.g. Apple®—Macbook Air®) to perform the computation or generation. Due to technological advances in computers and algorithms these efforts may change with time.

For example, based on results found in Secure Smart Embedded Devices, Platforms and Applications By Konstantinos Markantonakis and Dr. Keith Mayes, the amount of time required to encrypt one string of 2048 bits using the RSA public-key cryptosystem on an Apple®—Macbook Air® can be estimated to be 0.001 second, the amount of energy consumed during the computation can be estimated to be 0.0000001 kilowatt-hour, the monetary cost can be estimated to be 0.00000001 dollars. Hence one could say that encrypt one string of 2048 bits using the RSA public-key cryptosystem requires "little effort" in time and/or energy and/or monetary cost.

Now consider the example deep-string system above with 2048-bit RSA and Sd being the set of strings with exactly d leading zeros. Since determining from a deep-string A, its depth d can be done with one 2048 bit RSA encryption, based on the above, one can say that determining from a deep-string A, its depth d requires "little effort" in time and/or energy and/or monetary cost.

However, as described above, a user without access to the secret key would expect to use 2199023255552 encryptions to generate a deep-string of depth 40. Hence generating a deep-string of depth 40 would require an estimated 2199023256 (~2199023255552×0.001) seconds or approximately 7 years, use approximately 219902 (~2199023255552×0.0000001) kilowatt-hours, and require a monetary cost of approximately 21990 dollars (~2199023255552×0.00000001) and hence requires "significant effort" in time and/or energy and/or monetary cost.

Notice also, that as described above, a user with access to the secret key may generate a deep-string of depth 40 with essentially one 2048 bit RSA encryption, hence a user with access to the secret key can generate a deep-string of depth 40 with "little effort" (as above, approximately 0.001 second, 0.0000001 kilowatt-hour, 0.00000001 dollars of monetary cost).

It follows that a user with access to the secret key might generate a deep-string of depth 40 and make it available for purchase by another user for, say 100 dollars (rather than the 21990 dollars a user without the secret key would expend in monetary costs to generate such a string himself). Should the user without the secret key purchase the deep-string of depth 40 for 100 dollars, then we would say that his purchase cost of acquiring the string is 100 dollars.

In some embodiments, the sets S1, S2, . . . , Sw are chosen to decrease rapidly in size. In such embodiments, the time, energy and/or expense of using the ordinary-deep-string generator grows rapidly with d. In the examples above, where Sd is the set of strings with exactly d leading zeros, the time, energy and expense of producing a deep-string of deep-string-depth d+1 using the ordinary-deep-string generator is about twice that of producing a deep-string of deep-string-depth d.

Embodiments disclosed herein relate to computing and communications systems in which a first entity (for example, a computing system) sends a second entity a deep-string and the second entity applies a key of a cryptographic system or a one-way function to the deep-string to determine the deep-string's deep-string-depth. The second entity then uses the deep-string-depth in determining subsequent behavior. The second entity may, for example, by specifying a minimum depth that a deep-string must satisfy to ensure favorable behavior, effectively control the effort (e.g., in time, energy and/or dollars) expended by the first entity. In addition, in some embodiments the second entity or a third entity may generate and provide (e.g., by selling) deep-strings of various deep-string-depths to the first entity who may use them to ensure more favorable behavior of the second entity. In some embodiments the first entity is, for example: an electronic mail sender, a voice message sender, a text message sender, an online customer intending to make a purchase, a guest seeking access to an access controlled electronic resource such as a web site or file server. In some embodiments the second entity is, for example: an electronic mail server, an electronic mail receiver, a voice message server, a voice messages receiver, a text message server, a text message receiver, an online merchant, a host of an access controlled electronic resource such as a web site or file server.

According to an example embodiment, a message sender may attach a deep-string to a message. The message receiver may apply a key of a cryptographic system or a one-way function to the deep-string to determine the deep-string-depth. The message receiver may then use the deep-string-depth in determining the disposition of the message: for example, to delete it, forward it, read it, assign it a priority, and/or act upon its content. This provides a means for spam abatement. For example, a receiver may opt to delete all messages that fail to have an attached deep-string of predetermined deep-string-depth, thus messages from a sender who has not spent the required time, energy and/or expense needed to produce a deep-string of the predetermined deep-string-depth will be deleted. In addition, in some embodiments, to ensure a more favorable disposition of the message, the message sender may purchase deep-strings of desired deep-string-depth from the message receiver or a third party (e.g. the message server system). This provides a means, by which a message receiver or the third party may convert spam producers into paying customers.

According to another example embodiment, a visitor to a web site may send a deep-string to the web site operator. The web site operator may apply the key of a cryptographic system or a one-way function to the deep-string to determine the deep-string-depth. The operator may then use the deep-string-depth in determining how much access the visitor will be allowed on the web site: for example, if the deep-sting-depth is below a first threshold, no access to the site is granted; if the deep-sting-depth is above a first threshold but below a second threshold, limited access to the site is granted; if the deep-sting-depth is above the second threshold then complete access to the site is granted. This provides a means for access control and for mitigating denial of service attacks. For example, a visitor who has not spent the required time, energy and/or expense needed to produce a deep-string of deep-string-depth greater than the first threshold will be denied access. In addition, in some embodiments, to ensure greater access, the visitor may purchase deep-strings of desired deep-string-depth from the web site operator or a third party. This provides a means, by which a web site operator or the third party may charge visitors for access to a web site or other electronic resource.

According to yet another example embodiment, an on-line buyer may send an on-line seller a deep-string as an offer of payment for information, goods, services or other items of value. The seller may apply the key of a cryptographic system or a one-way function to the deep-string to determine the deep-string-depth. The seller may then use the deep-string-depth to determine whether to accept the deep-string as payment for the items. For example, the seller may use the deep-string-depth to determine a monetary value for the deep-string and accept the deep-string as payment for items that do not exceed that value. In addition, in some embodiments, to acquire items, the customer may purchase deep-strings of desired deep-string-depth from the seller or a third party. This provides a means, by which a seller or the third party may provide a digital analogue of gift cards.

Example Electronic Message System

In an example embodiment, using dual-deep-systems, a message server operating to process messages on behalf of message senders and message receivers receives a message addressed to a message receiver, where the message has one or more associated (for example, attached) deep-strings. The message server applies one or more cryptographic keys or one-way functions to a subset of the associated deep-strings to determine their depth. Based on factors including the calculated depths of the deep-strings, the message server determines how to dispose of the message. For example, if the depths are below predetermined levels, the message server deletes the message without passing it on to the addressed message receiver and if the depths are above the predetermined levels, the message server passes the message on to the addressed message receiver. Or, for example, if the depths are below predetermined levels, the message server marks the message as possible spam and forwards it to the message receiver. The predetermined levels of depth may be chosen so as to impose a particular level of effort upon the message sender in terms of the time, energy and cost required to generate the appropriate deep-strings.

Upon receipt of a message from the message server, the message receiver applies one or more cryptographic keys or one-way functions to a subset of the associated deep-strings to determine their depths (this subset may or may not intersect the subset of deep-strings used by the message server). Based on factors including the depths that have been determined, the message receiver determines how to dispose of the message. For example, if the message sender appears on the message receiver's contact list, the message receiver ignores the deep-strings and their depths and reads the message (or stores it in the inbox). If the message sender does not appear on the message receiver's contact list, and the depths of the deep-strings are below predetermined levels, the message receiver deletes the message. If the message sender does not appear on the message receiver's contact list, and the depths are above the predetermined levels, the message receiver assigns a priority for the message based on factors including the depths of the deep-strings; the message receiver then lists messages in the inbox based on that priority for later consideration. The predetermined levels of depth may be chosen so as to impose a particular level of effort upon the sender in terms of the time, energy and/or cost required to generate the appropriate deep-strings.

Therefore, by requiring that at least certain messages are accompanied by deep-strings having at least a predetermined depth, embodiments may impose a substantial effort (e.g. in energy and/or time and or cost) upon message senders of such messages. In the case of spam senders, according to some embodiments, because the spam sender must incur some non-deminimis cost for each message sent and because they send such spam messages in large numbers, the spam sender is required to incur a substantial cost for sending the spam messages.

For example, according to http://en.wikipedia.org/wiki/Email_spam, "As of August 2010, the amount of spam was estimated to be around 200 billion spam messages sent per day. More than 97% of all emails sent over the Internet are unwanted, according to a Microsoft security report". Hence if message servers use a dual-deep system and choose depths so that the monetary cost of producing a string of sufficient depth to avoid automatic deletion of a sent message is, for example, two cents. Then to continue sending the 200 billion spam messages per day and avoid automatic deletions would require 4 billion dollars per day, a tremendous burden on spammers.

It is expected that, in electronic message systems configured according to the teachings herein, a sufficiently high burden of effort (e.g. in energy and/or time and or cost) will discourage the transmission of spam messages so that spam message transmission and its associated costs to the message server and/or message receivers can be altogether eliminated or at least substantially reduced. The predetermined required depth may be chosen so that only the spam generators who are unwilling to incur any substantial cost are discouraged from sending spam, or so that most spam generators would find it infeasible to continue generating spam. A person of skill in the art would appreciate that the effort (e.g. in energy and/or time and or cost) for certain processing tasks will change over time, and therefore selected predetermined required depths may also have to be reconfigured over time as the capabilities and cost of processing resources available to spam generators change over time.

In the example embodiment above a singular-deep-system may be employed. In which case rather than applying cryptographic keys to the associated (for example, attached) deep-strings, one-way functions are employed. However, if a dual-deep-system is used, additional features are possible. When a dual-deep-system is used the option exists for the message server and/or message receiver to profit from certain types of spam such as spam used in advertising.

For example, consider an embodiment as described above and with the dual-deep-system based on a public key cryptosystem (e.g. on the RSA cryptosystem) where there is a public key, P, and a secret key, S, where S is only accessible by the message receiver and/or message server and is not made public, and where a string, M, has depth d if and only if it when encrypted using the public key, P, the resulting string has exactly d leading zeros. As described above, the message receiver and/or the message server may create dual-deep-strings of desired depth with little effort (e.g. in energy and/or time and or cost) by using the special deep-string generator-which requires exactly one encryption. These dual-deep-strings may be offered for sale to advertisers. For example, a spammer, confronted with mounting costs to send spam advertising due to the system described above, may be converted to a paying customer. A former spammer who purchases deep string from the message server and/or message receiver may attach them (or otherwise associate them) with advertising messages and thereby avoid the spam elimination apparatus described above. Hence the message server may sell his willingness not to delete a message from a message sender for a price of his choosing and a message receiver may sell his willingness to submit to an advertisement for a price of his choosing.

For example, according to http://en.wikipedia.org/wiki/Email_spam, "As of August 2010, the amount of spam was estimated to be around 200 billion spam messages sent per day. More than 97% of all emails sent over the Internet are unwanted, according to a Microsoft security report". Hence if message servers use a dual-deep system and choose depths so that the monetary cost of producing a string of sufficient depth to avoid automatic deletion of a sent message is, for example, two cents. Then to continue sending the 200 billion spam messages per day and avoid automatic deletions would require 4 billion dollars per day, a tremendous burden on spammers. However, using the secret key, servers could generate such strings with "little effort" (e.g. cost of 0.0000001 cents each and hence a cost of 200 dollars for 200 billion strings) and make them available for purchase for, for example, one-half cent. Then to continue sending the 200 billion spam messages per day and avoid automatic deletions would require a payment from spammers to servers of 1 billion dollars per day. What in fact the servers could charge for such deep strings, would, of course, depend on the market factors; however, by these means, the servers could share in the profits that spammers currently accrue. The situation is analogous to that with TV commercials wherein servers provide advertisers access to audiences in return for advertising dollars that represent a share of the advertiser's profits.

FIG. 1 is a high-level block diagram of an electronic message system 100 according to one or more embodiments.

System 100, as described herein, is an electronic mail message system. However, in some embodiments, for example and without limitation, system 100 may include a text messaging system (e.g., short messaging system), electronic voicemail messaging system, or other electronic system that enables a user to receive messages from other users, etc.

System 100 includes a receiver 102, a sender 104, and a message server 106. The receiver 102, sender 104 and message server 106 are communicatively interconnected by a network 109 such as the Internet or any other communication network that provides for exchanging electronic messages. A sender 104, may generate an electronic message and send it to a receiver 102. The message may be addressed using any form of an address that can be recognized by the components of system 100 so that the message can be correctly routed to the receiver 102. In addition to the components shown in FIG. 1, system 100 may include one or more other components, such as, for example, components for message storage devices, message routing devices, firewalls, proxy servers, etc.

Receiver 102 includes a computing device such as, but not limited to, a smartphone, a tablet computer, a personal computer, a server computer, or other type of computing device capable of processing incoming messages and providing access to such messages, etc. In some embodiments, the receiver may include software programs that accesses messages received by receiver 102. In some embodiments receiver 102 may include a mail client such as, or similar to, Microsoft Outlook Client™. Receiver 102 may have associated with it a human user, groups of individuals, organizations, groups of organizations, etc. In some embodiments, receiver 102 may include, or be associated with, an electronic system that may automatically (e.g. without human action) receive and/or respond to a sender, such as sender 104.

Sender 104 includes a computing device such as, but not limited to, a smartphone, a tablet computer, a personal computer, a server computer, or other type of computing device capable of processing outgoing messages and providing access to such messages, etc. In some embodiments, the sender may include software programs that send messages. In some embodiments, sender 104 may include a mail client such as, or similar to, Microsoft Outlook Client™. Sender 102 may have associated with it a human user, groups of individuals, organizations, groups of organizations, groups of organizations, etc. In some embodiments, sender 104 may include, or be associated with, an electronic system that may automatically (e.g. without human action) create and transmit messages to a receiver, such as receiver 102.

Server 106 includes computing devices and software capable of processing messages. In some embodiments, server 106 may include a mail server such as, or similar to, Microsoft Exchange Server™.

Figure 3:
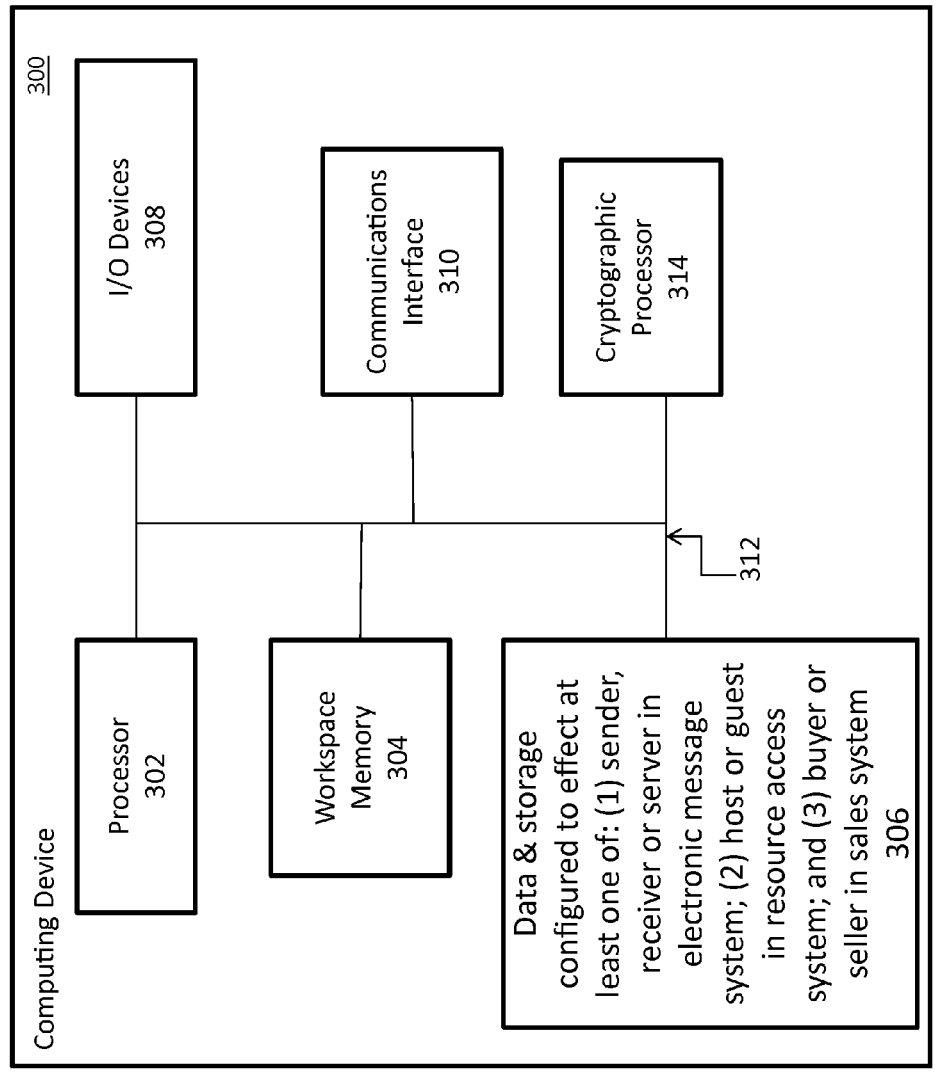
FIG. 3 is a high-level block diagram of a computer which can be configured to operate as a sender, receiver, or message server in an electronic message system, a host or guest in a resource access system, a seller or buyer in a sales system according to one or more embodiments.

Each of the entities, receiver 102, sender 104 and server 106, may include one or more processing systems including, for example, at least one computer, such as computer 300 illustrated in FIG. 3. Computer 300, further described below, is a simplified block diagram of a general purpose computer which can be configured and/or programmed with software and/or hardware components in order to operate as one or more of sender 104, receiver 102, and server 106. Communication connections from each of sender 102, receiver 104, and server 106, to others may include any combination of electronic communication mediums, such as, for example, local area networks, point to point connections, wide area networks, internet, wireless networks, wired networks, etc.

Figure 2:
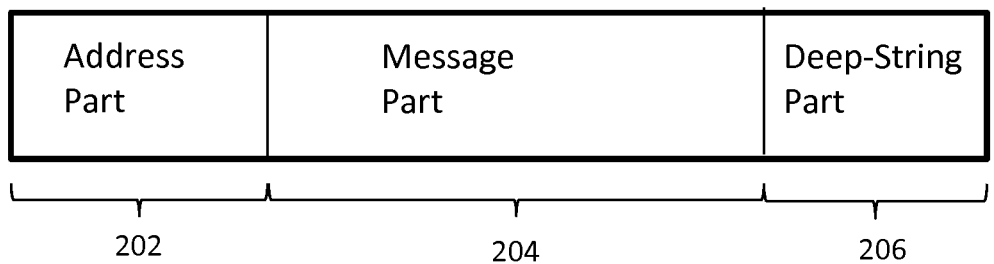
FIG. 2 illustrates a message format that can be used in an electronic message system, in accordance with one or more embodiments.

In some embodiments, messages transmitted from sender 104 to receiver 102 may include messages of the form of message 200 illustrated in FIG. 2. Message 200 includes an addressing information part 202, a message part 204 and a deep-string part 206. The addressing information part 202 includes addressing information such as the addresses of one or more receivers, and, optionally, the address of the sender. The addresses may be in any form that can be used by components of system 100 to route the message to the correct receiver(s). In some embodiments, the addresses may be in the standard email address form of receiving_user_identifier@receiver_domain.domain_extension, where receiver_domain and domain_extension uniquely identifies a domain or entity to which the receiving message server (e.g., message server 106) and/or receiver (e.g., receiver 102) belongs.

The message part 204 includes the information content of the message. The message part 204 may include, for example, information to be conveyed to the receiver(s) in text, images, audio, video form, or a combination thereof.

The deep-string part 206 may include one or more deep-strings. The deep-strings may be of a predetermined length.

FIG. 3 is a high-level block diagram of computer 300, and includes one or more processors 302, memory 304, storage 306, input/output devices 308, communications (e.g. network) interface 310 and cryptographic processor 314. A communication infrastructure 312 interconnects the one or more processors 302, memory 304, storage 306, input/output devices 308, communications interface 310, and cryptographic processor 314.

One or more processors 302 may include one or more central processing units, specialized cryptographic processors, ASICs, FPGAs, or any other type of logic circuitry capable of executing instructions. Memory 304 includes random access memory (RAM) or any other volatile memory, and storage 306 includes any non-volatile memory (e.g., magnetic disk, FLASH, etc). Data and/or programs may be stored in storage 306. Data and/or programs may reside in memory 304 when, for example, a program is being executed by processor 302. I/O devices 308 may include one or more displays, keyboards, mouse, etc. Communication interface 310 may include one or more of a network interfaces, such as, wireless network interfaces (e.g., WIFI, Bluetooth, Near Field Communications (NFC)), and/or wired network interfaces (e.g., Ethernet). Cryptographic processor 314 may include one or more of central processing units, or specialized cryptographic processors.

Figure 4:
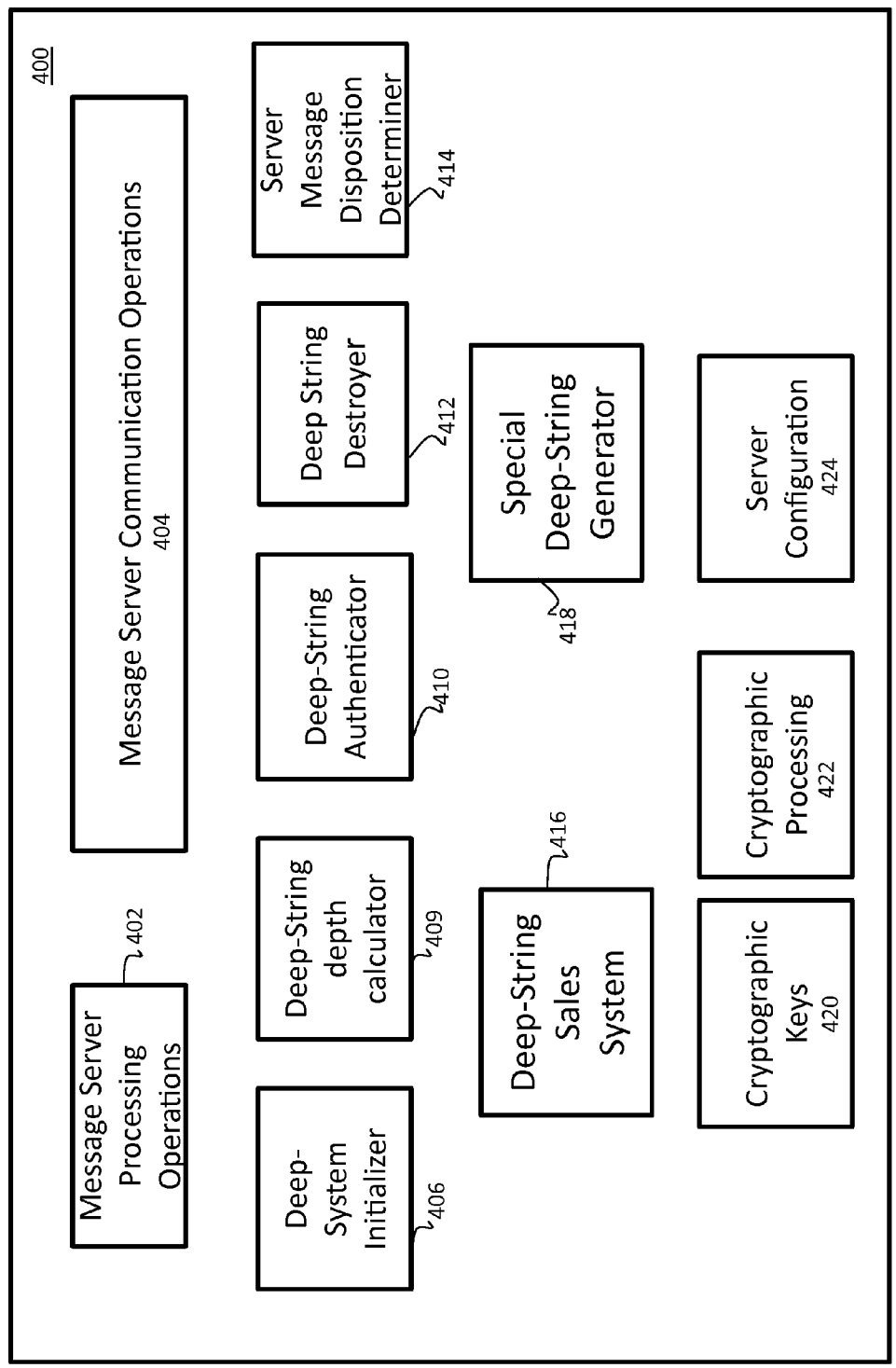
FIG. 4 illustrates some components of a system that is associated with the message server of an electronic messaging system, in accordance with one or more embodiments.

FIG. 4 illustrates a set of software/firmware/hardware components 400 that is associated with the message server, such as message server 106, of a system 100, in accordance with one or more embodiments. The set of components 400 may be included in one or more computing devices, such as, for example, computer 300, operating as message server 106.

The set of server components 400 may include a message server processing component 402, message server communications component 404, a deep-system initializer 406, a deep-string depth calculator 409, a deep-string authenticator 410, a deep-string destroyer 412, a server message disposition determiner 414, a cryptographic key component 420, a cryptographic processing component 422, and a server configuration component 424. Server components 400 may further include optional components for deep-string operations in dual-string-systems such as deep-string sales system 416 and special deep-string generator 418. It will be understood that a server, such as server 106, may include some of all of the components shown in the set of components 400, and may also include one or more components not shown in the set of components 400.

Figure 8:
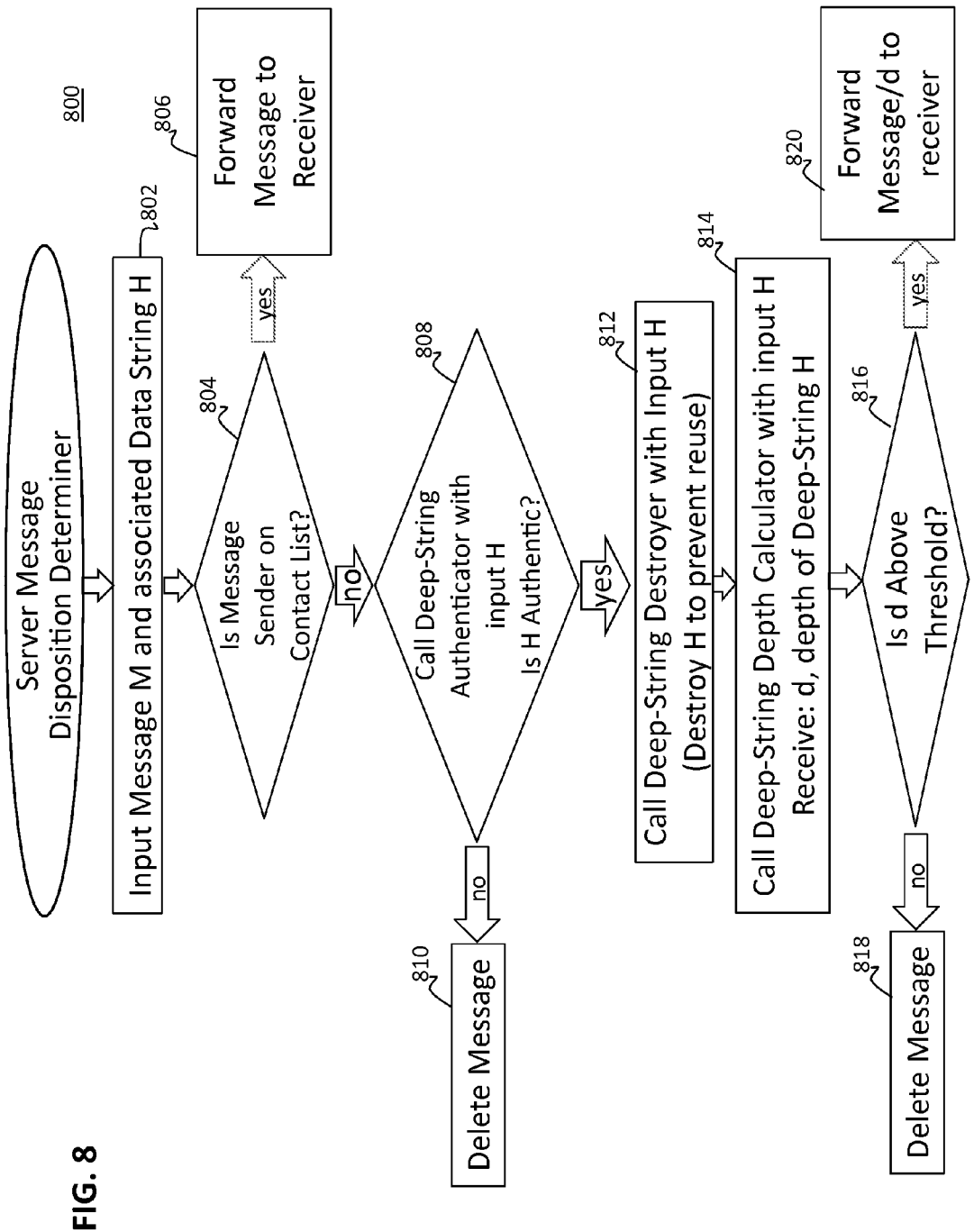
FIG. 8 illustrates a flowchart for a process for server message disposition determination in an electronic messaging system, in accordance with one or more embodiments.
Figure 18:
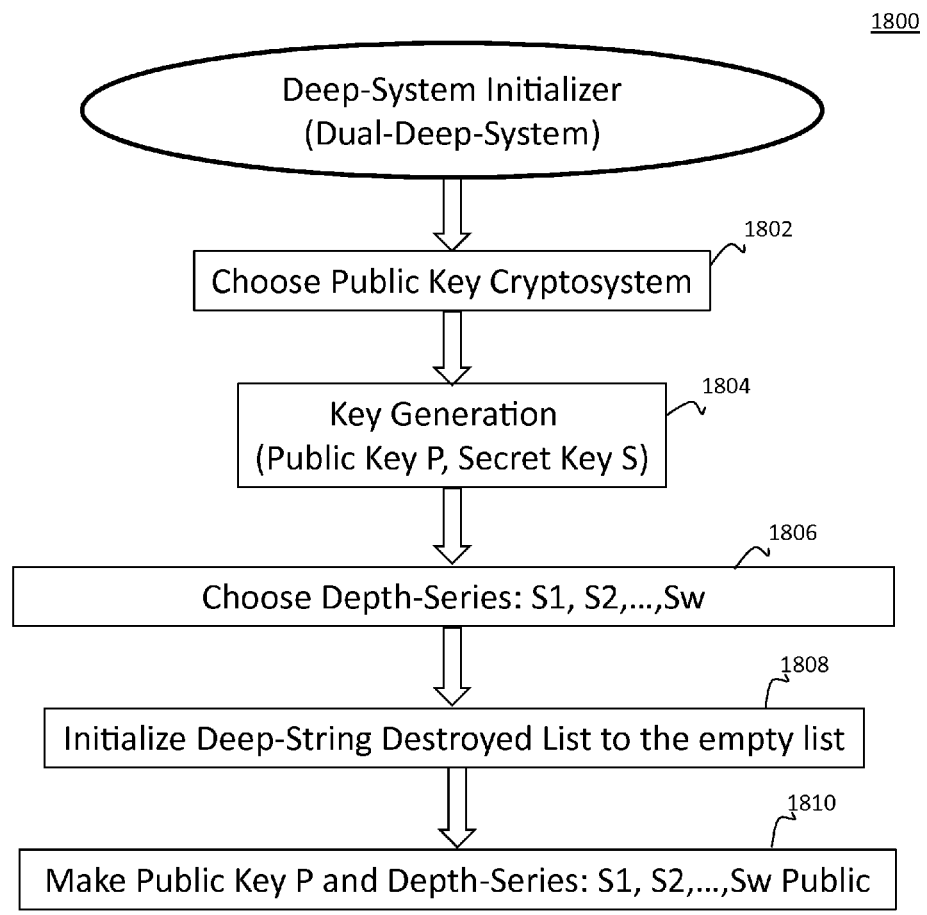
FIG. 18 is a flowchart of an initializing process performed by a deep-system initializer component, when a dual-deep-system is used, according to some embodiments.
Figure 19:
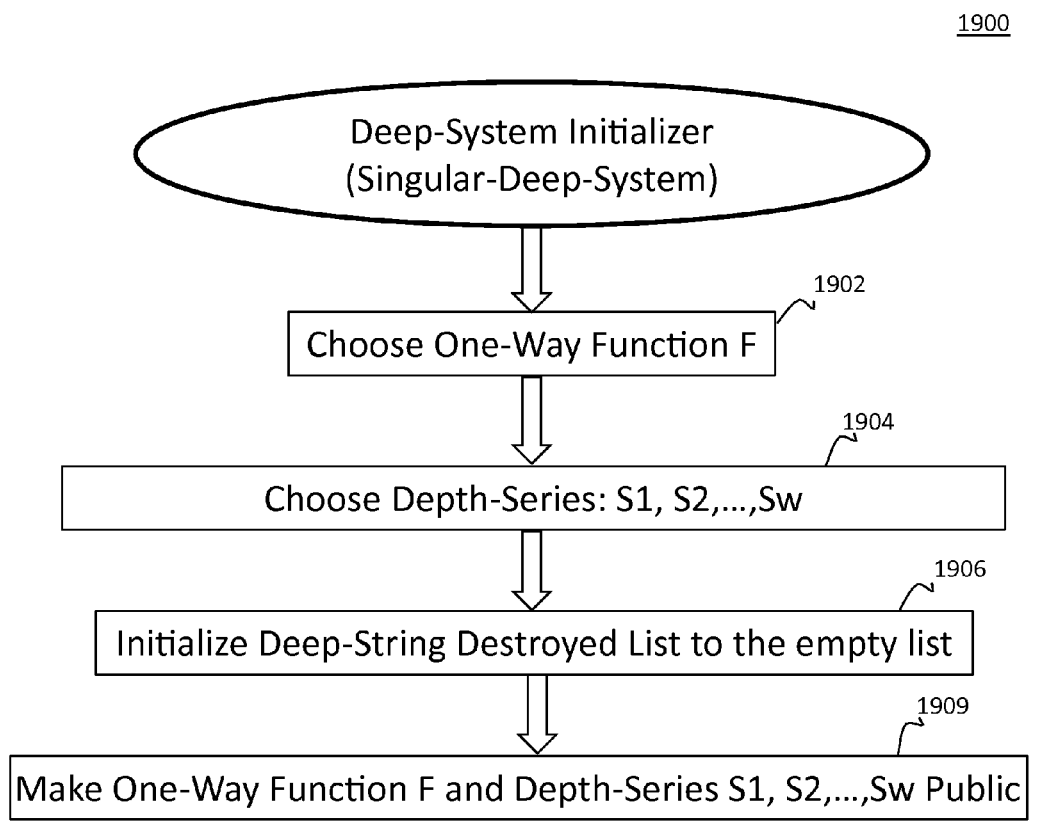
FIG. 19 is a flowchart of an initializing process performed by a deep-system initializer component, when a singular-deep-system is used, according to some embodiments.
Figure 20:
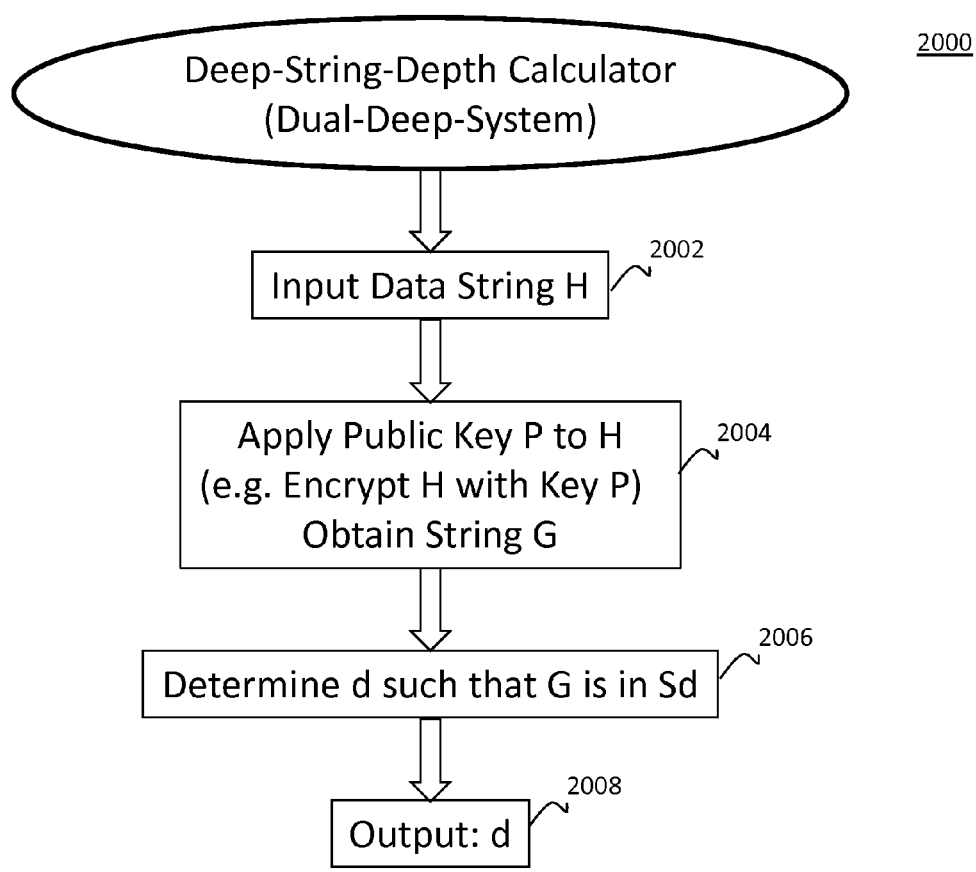
FIG. 20 is a flowchart of a process for calculating deep-string-depth, when a dual-deep-system is used, according to some embodiments.
Figure 21:
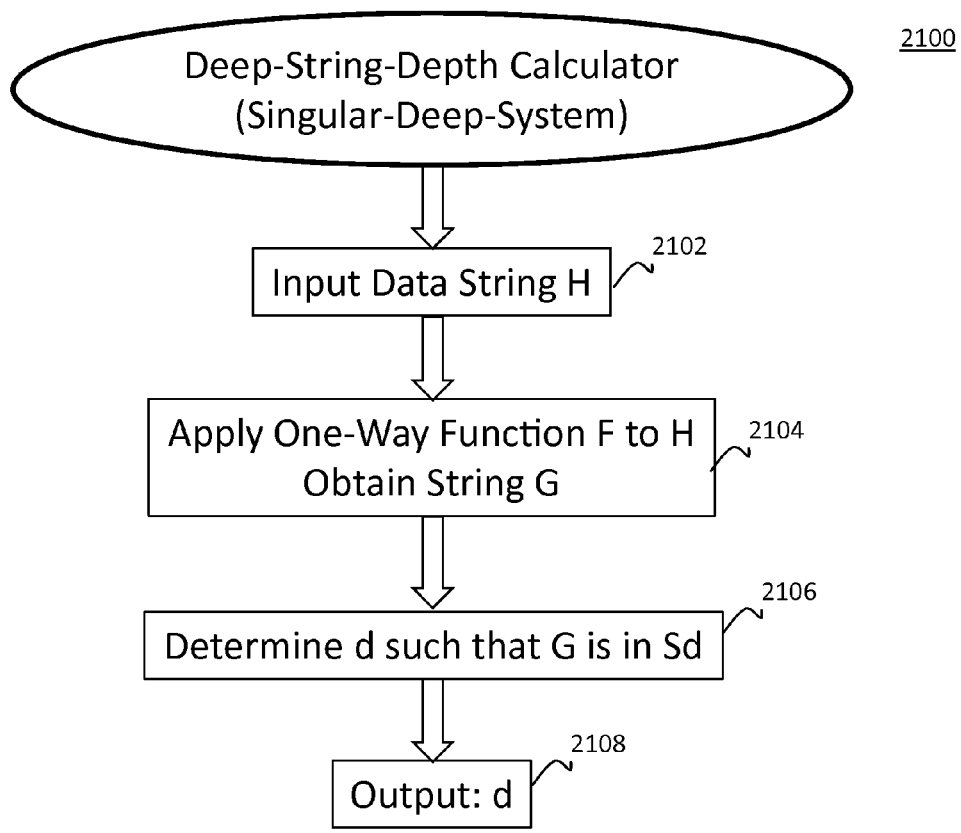
FIG. 21 is a flowchart of a process for calculating deep-string-depth, when a singular-deep-system is used, according to some embodiments.
Figure 22:
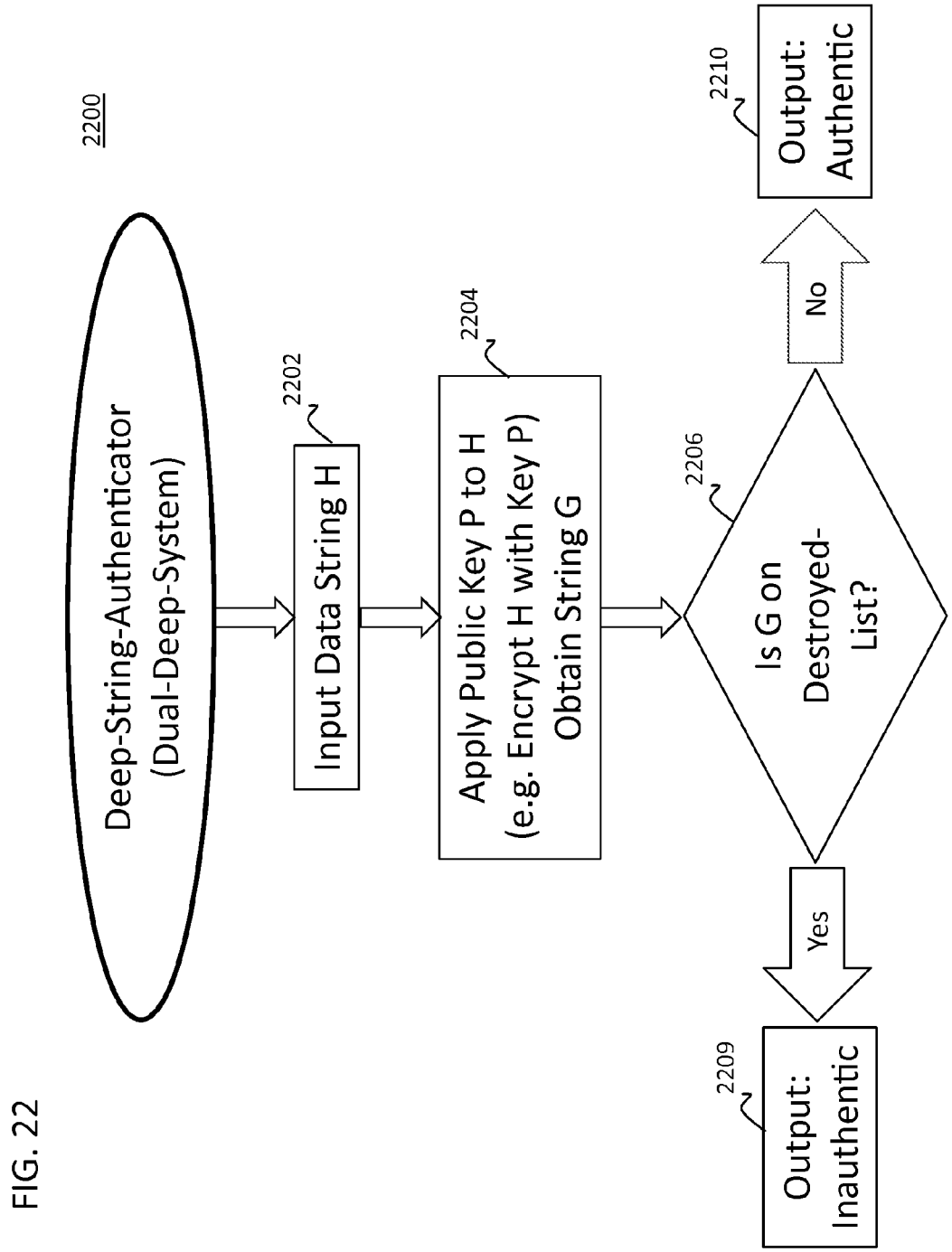
FIG. 22 is a flowchart of a process performed by a deep-string-authenticator, when a dual-deep-system is used, according to some embodiments.
Figure 23:
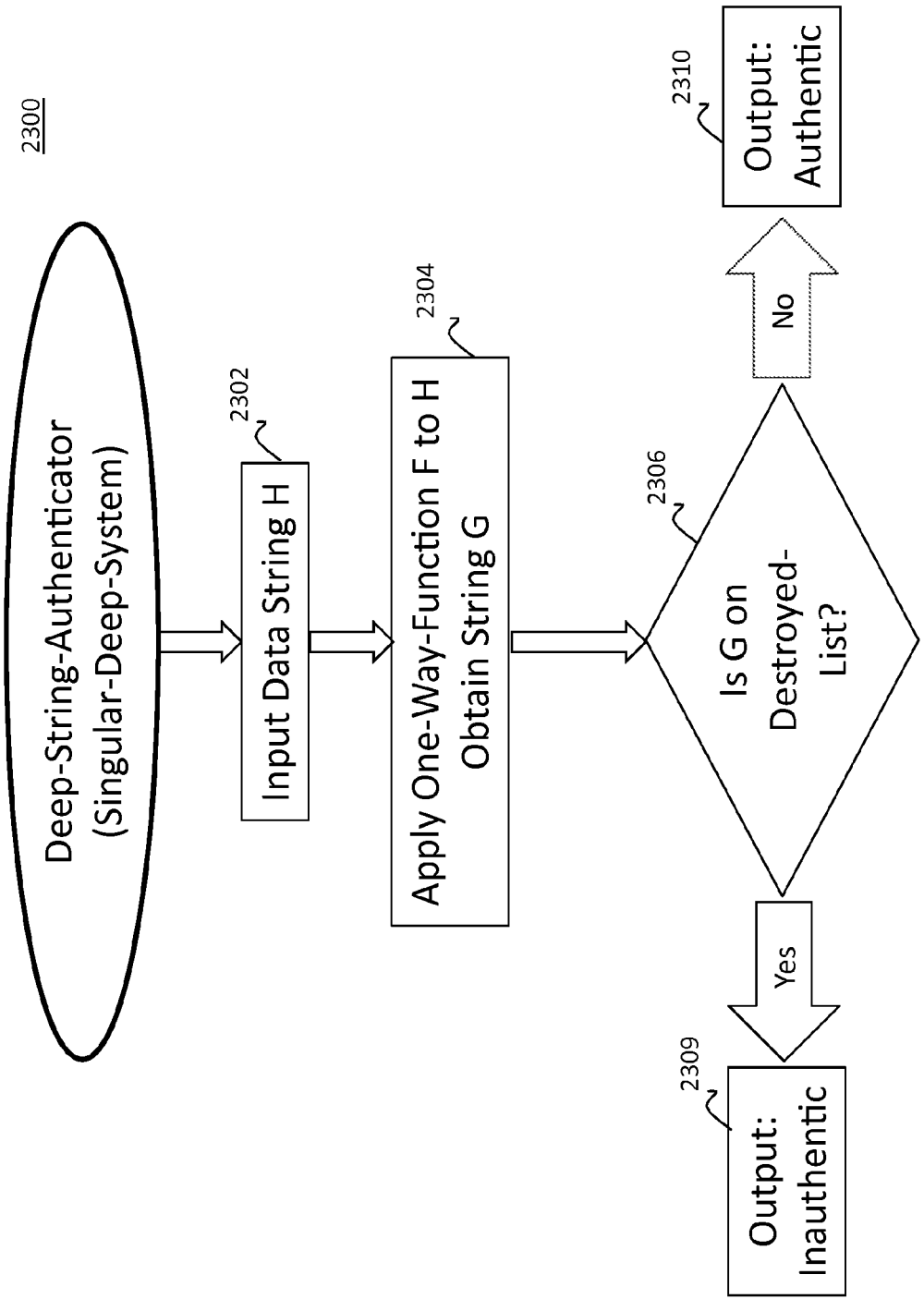
FIG. 23 is a flowchart of a process performed by a deep-string-authenticator, when a singular-deep-system is used, according to some embodiments.
Figure 24:
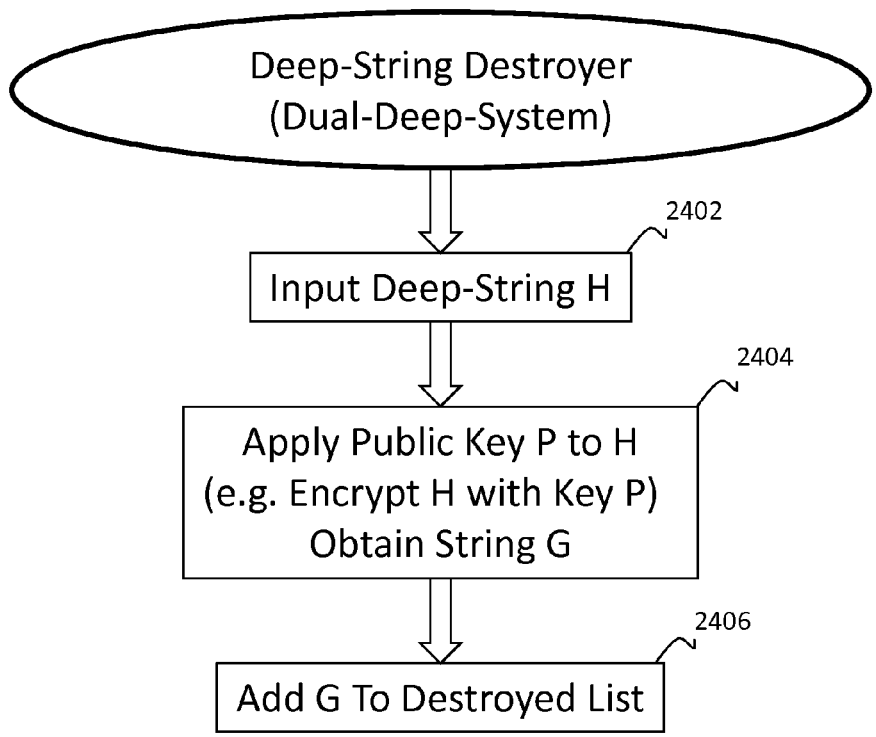
FIG. 24 is a flowchart of a process performed by a deep-string-destroyer component, when a dual-deep-system is used, according to some embodiments.
Figure 25:
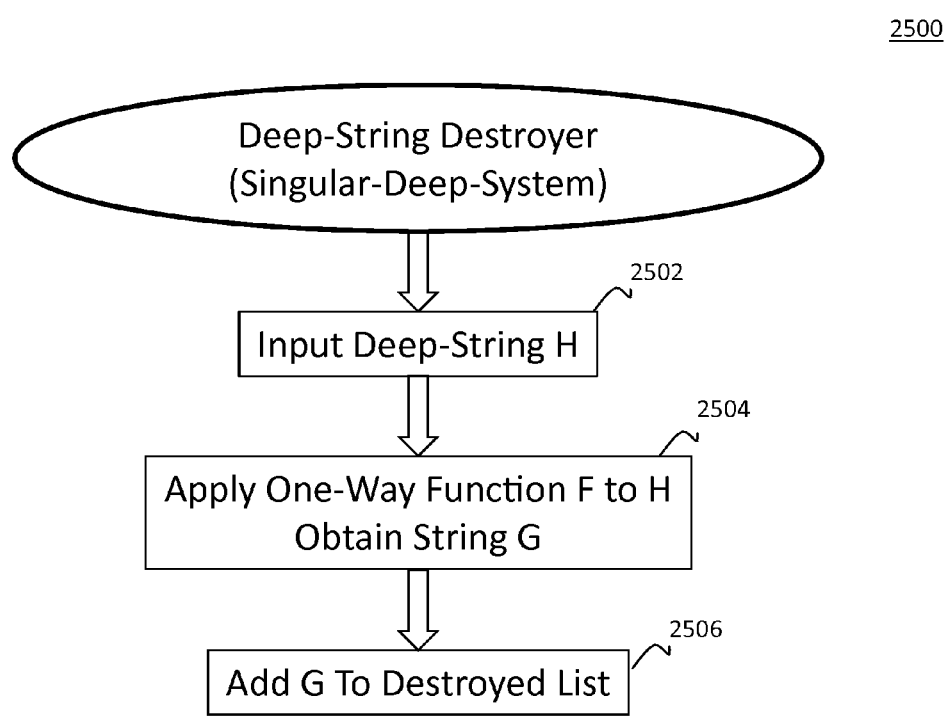
FIG. 25 is a flowchart of a process performed by a deep-string-destroyer component, when a singular-deep-system is used, according to some embodiments.
Figure 28:
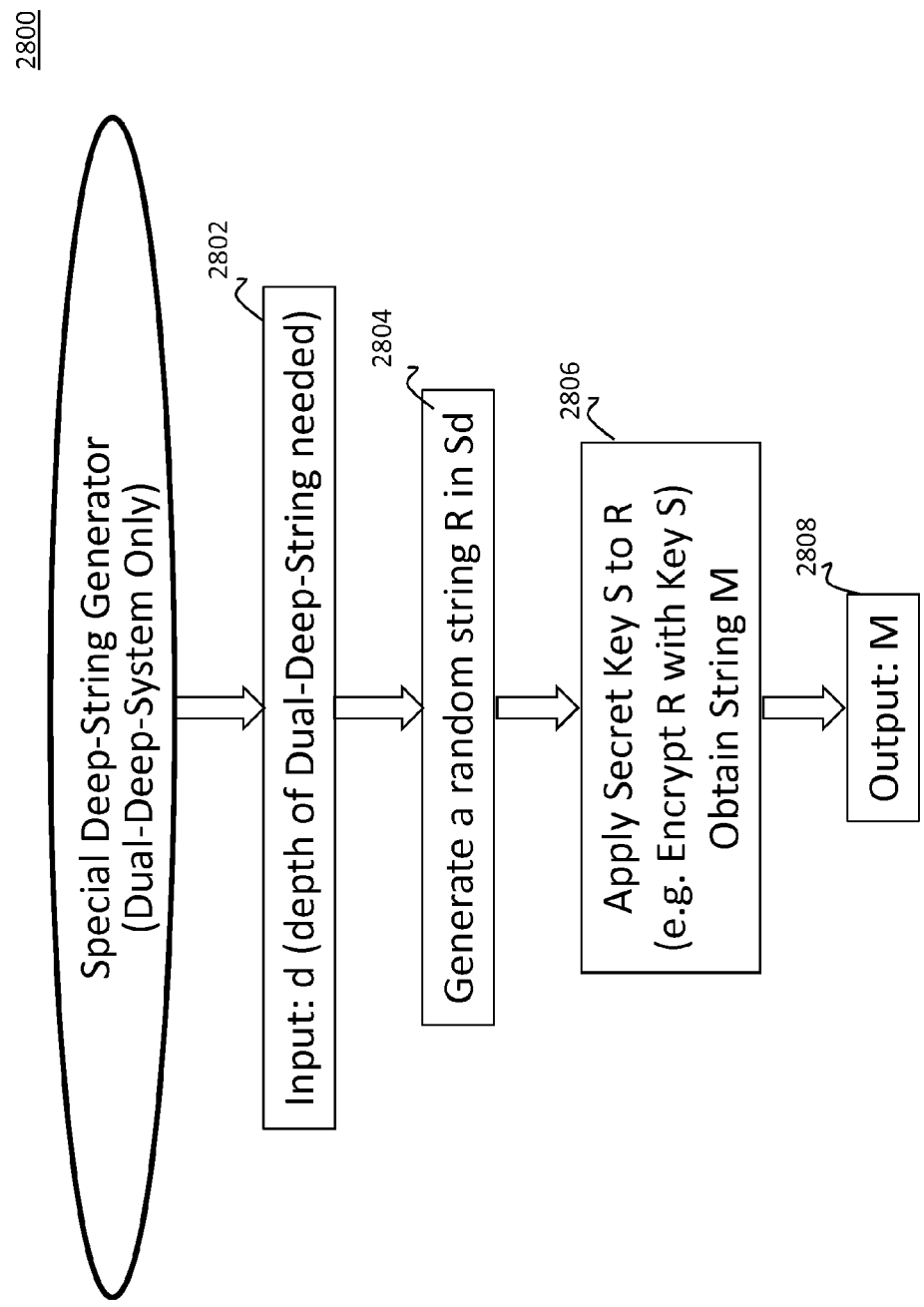
FIG. 28 is a flowchart of a process performed by a special deep-string generator component, according to some embodiments.

FIG. 18 describes the operations, in some embodiments, of the deep-system initializer 406 in flowchart form when a dual-deep-system is being employed. FIG. 19 describes the operations, in some embodiments, of the deep-system initializer 406 in flowchart form when a singular-deep-system is being employed. FIG. 20 describes the operations, in some embodiments, of the deep-string depth calculator 409 in flowchart form when a dual-deep-system is being employed. FIG. 21 describes the operations, in some embodiments, of the deep-string depth calculator 409 in flowchart form when a singular-deep-system is being employed. FIG. 22 describes the operations, in some embodiments, of the deep-string authenticator 410 in flowchart form when a dual-deep-system is being employed. FIG. 23 describes the operations, in some embodiments, of the deep-string authenticator 410 in flowchart form when a singular-deep-system is being employed. FIG. 24 describes the operations, in some embodiments, of the deep-string destroyer 412 in flowchart form when a dual-deep-system is being employed. FIG. 25 describes the operations, in some embodiments, of the deep-string destroyer 412 in flowchart form when a singular-deep-system is being employed. FIG. 28 describes the operation, in some embodiments, of the special deep-string generator 418 in flowchart form when a dual-deep-system is being employed. FIG. 8 describes the operation, in some embodiments, of the server message disposition determiner 414 in flowchart form.

Message server communications component 404 includes operations for transmitting and receiving messages using one or more network interfaces of the server 106. In some embodiments, standard transmit and receive operations may be used. Transmitting messages may include transmitting messages such as message 200 via a network interface of server 106. Receiving messages include receiving a message such as message 200 via a network interface of server 106.

Message server processing component 402 may include a message server processing program. For example, a message server processing program similar to Microsoft Exchange Server™. The message server component performs standard operations of a message server, for example, routing and storing messages. In addition, the message server processing component 402 may perform operations necessary for operating the deep-string system which may entail invoking or accessing any of the: deep-system initializer 406, deep-string depth calculator 408, deep-string authenticator 410, deep-string destroyer 412, message disposition determiner 414, deep-string sales system 416, special deep-string generator 418, cryptographic keys 420, cryptographic processing 422 or server configuration 424.

In an example embodiment, prior to receiving messages, the message server processing component 402 calls the deep-system initializer 406. If a dual-deep-system is being used, then the deep-system initializer 406 generates a public key, P, a secret key, S, a depth-series S1, S2, . . . Sw, and initializes a deep-string destroyed list. The public key P, and depth-series S1, S2, . . . Sw, are made public, the secret key, S, remains private and is stored and made accessible to the message server for future use. If a singular-deep-system is being used, then the deep-system initializer 406 chooses a one-way function F, a depth-series S1, S2, . . . Sw, and initializes a deep-string destroyed list. The one-way function (or an algorithm that computes it), F, and depth-series S1, S2, . . . Sw, are made public.

Upon receiving a message, for example in format 200 as shown in FIG. 2, the message server processing component 402 calls the server message disposition determiner 414. The server message disposition determiner 414 will determine the disposition of the message. For example, in one embodiment the server message disposition determiner 414 may access the receiver 102 contact list and, if the sender 104 is on the list, may dispose of the message by forwarding it to the receiver. If the sender 104 is not on the contact list, then the server message disposition determiner 414 may access the deep-string associated with the message, for example, the deep-string part 206 in FIG. 2 and call the deep-string authenticator 410 to determine the authenticity of the deep-string part. If not authentic, then the server message disposition determiner 414 may dispose of the message by deleting it without forwarding it to the receiver 102. If authentic, then the server message disposition determiner 414 may call the deep-string destroyer 412 to assure that the deep-string under consideration cannot be reused in the future. The server message disposition determiner 414 may then call the deep-string depth calculator 408 to determine the deep-string-depth, d, of the deep string.

The server message disposition determiner 414 may then compare the deep-string-depth, d, to a predetermined deep-string depth threshold stored in the server configuration 424. If the deep-string-depth, d is below the predetermined deep-string depth threshold then the server message disposition determiner 414 may dispose of the message by deleting it without forwarding it to the receiver 102. If the deep-string-depth, d is above the predetermined deep-string depth threshold then the server message disposition determiner 414 may pass the message, along with addition information such as the deep-string depth, d, to the intended message receiver.

In some embodiments the server message disposition determiner 414 may calculate whether or not the deep-string depth d is above or below a single predetermined deep-string depth threshold. In some other embodiments, however, the server message disposition determiner 414 may determine whether or not the deep-string depth d is above or below each of a plurality of predetermined deep-string depth thresholds. In some embodiments, the server message disposition determiner 414 may determine whether or not the deep-string depth d satisfies a plurality of predetermined depth requirements that may or may not be predetermined deep-string depth threshold requirements. In such embodiments, the server message disposition determiner 414 may dispose of the message in accordance with the outcomes of all of these determinations. In some other embodiments, there may be multiple deep-strings each of which may or may not be processed to determine the message disposition.

In some embodiments, the message server may make some aspects of the server message disposition determiner 414 public. For example, indicating the deep-string depth required of a message to avoid automatic deletion. This may deter spammers without the resources to generate deep-strings of such depth or may encourage them to purchase deep-strings of such depth from the deep-string sales system 416 (if available).

Deep-string sales system component 416 operates to generate deep-strings and provide (e.g. by selling) such generated deep-strings to message sender 104, so that the sender may avoid generating deep-strings himself at potentially great effort (e.g. in energy and/or time and or cost).

For example, a sender (e.g., a former spammer) may, before sending a message, obtain a deep-string with a predetermined depth from the deep-string sales system 416. The sender may then form and transmit the massage with the obtained deep-string. The deep-string sales system 416 may generate the deep-strings using, for example, the special deep-string generator 418.

Message server components 400 may also include cryptographic key component 420, and a cryptographic processing component 422. The cryptographic key component 420 operates to acquire and/or maintain one or more cryptographic keys, such as, for example, one or more keys of one or more public key cryptosystems or to acquire and maintain one or more one-way functions or algorithms to compute them. The cryptographic processing component 422 operates to perform encryption/decryption of data strings in accordance with a selected cryptosystem or operates to compute one or more one-way functions of data strings.

Message server components 400 may also include a server configuration component 424 which operates to configure parameters associated with server operations. For example, one or more predetermined depth requirements (e.g. predetermined deep-string depth threshold requirements) for deep-strings may be configured upon which a disposition of the incoming messages may be entirely or partially based. The configurations may include one or more predetermined depth requirements for each receiving user or group of users, or a common set of one or more predetermined depth requirements for all users. For example, message receivers may each have a personal set of predetermined depth requirements. For example one message receiver may set a high personal predetermined depth threshold that makes it very difficult for sender's messages to avoid deletion, while another message receiver may set a low personal predetermined depth threshold that makes it fairly easy for sender's messages to avoid deletion.

Figure 5:
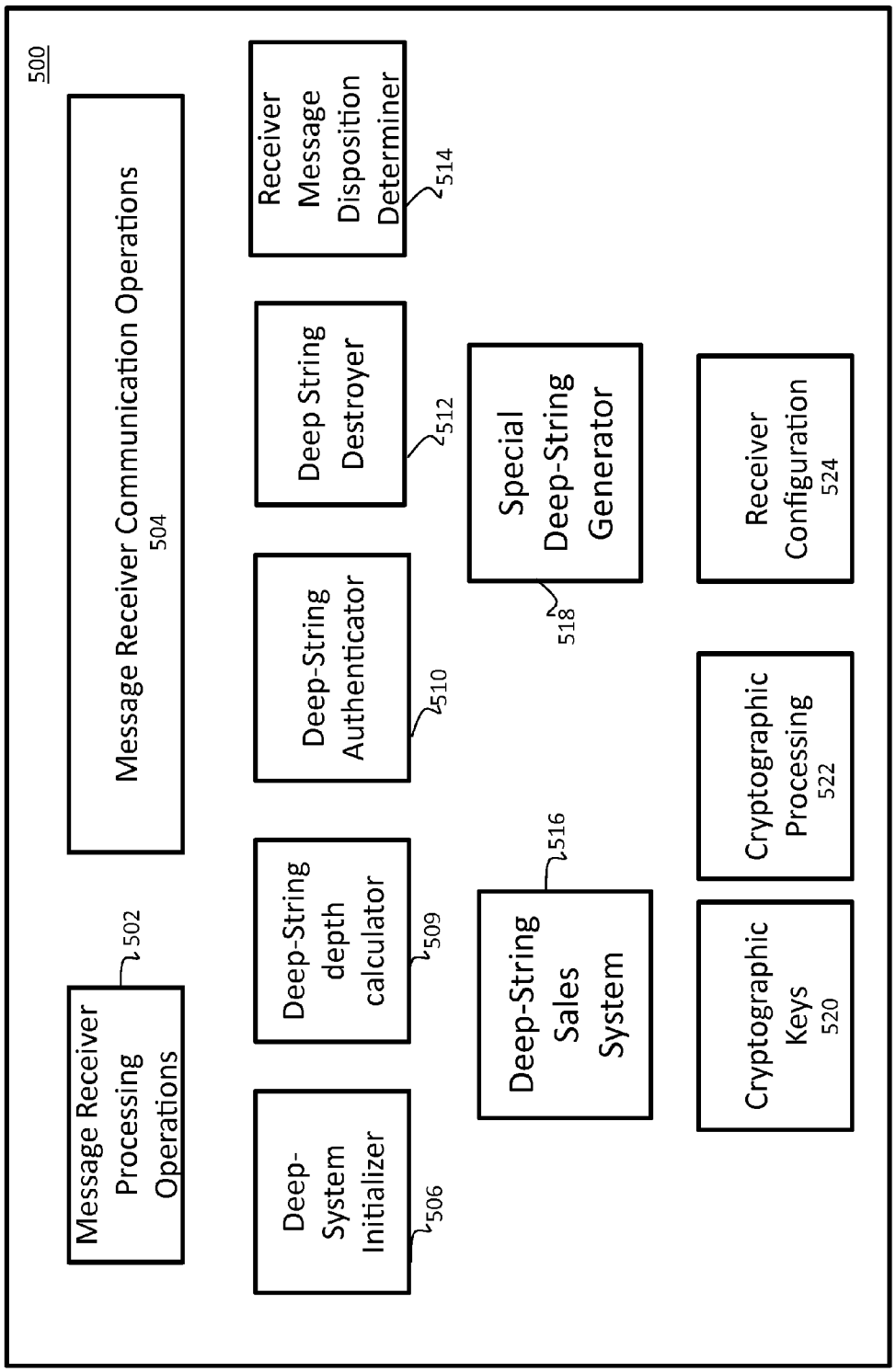
FIG. 5 illustrates some components of a system that is associated with the message receiver in an electronic messaging system, in accordance with one or more embodiments.

FIG. 5 illustrates a set of software/firmware/hardware components 500 that is associated with the message receiver, such as message receiver 102, of a system 100, in accordance with one or more embodiments. The set of components 500 may be included in one or more computing devices, such as, for example, computer 300, operating as message receiver 102.

The set of receiver components 500 may include a message receiver processing component 502, message receiver communications component 504, a deep-system initializer 506, a deep-string depth calculator 509, a deep-string authenticator 510, a deep-string destroyer 512, a receiver message disposition determiner 514, a cryptographic key component 520, a cryptographic processing component 522, and a receiver configuration component 524. Receiver components 500 may further include optional components for deep-string operations in dual-string-systems such as deep-string sales system 516 and special deep-string generator 518. It will be understood that a receiver, such as receiver 102, may include some of all of the components shown in the set of components 500, and may also include one or more components not shown in the set of components 500.

Figure 9:
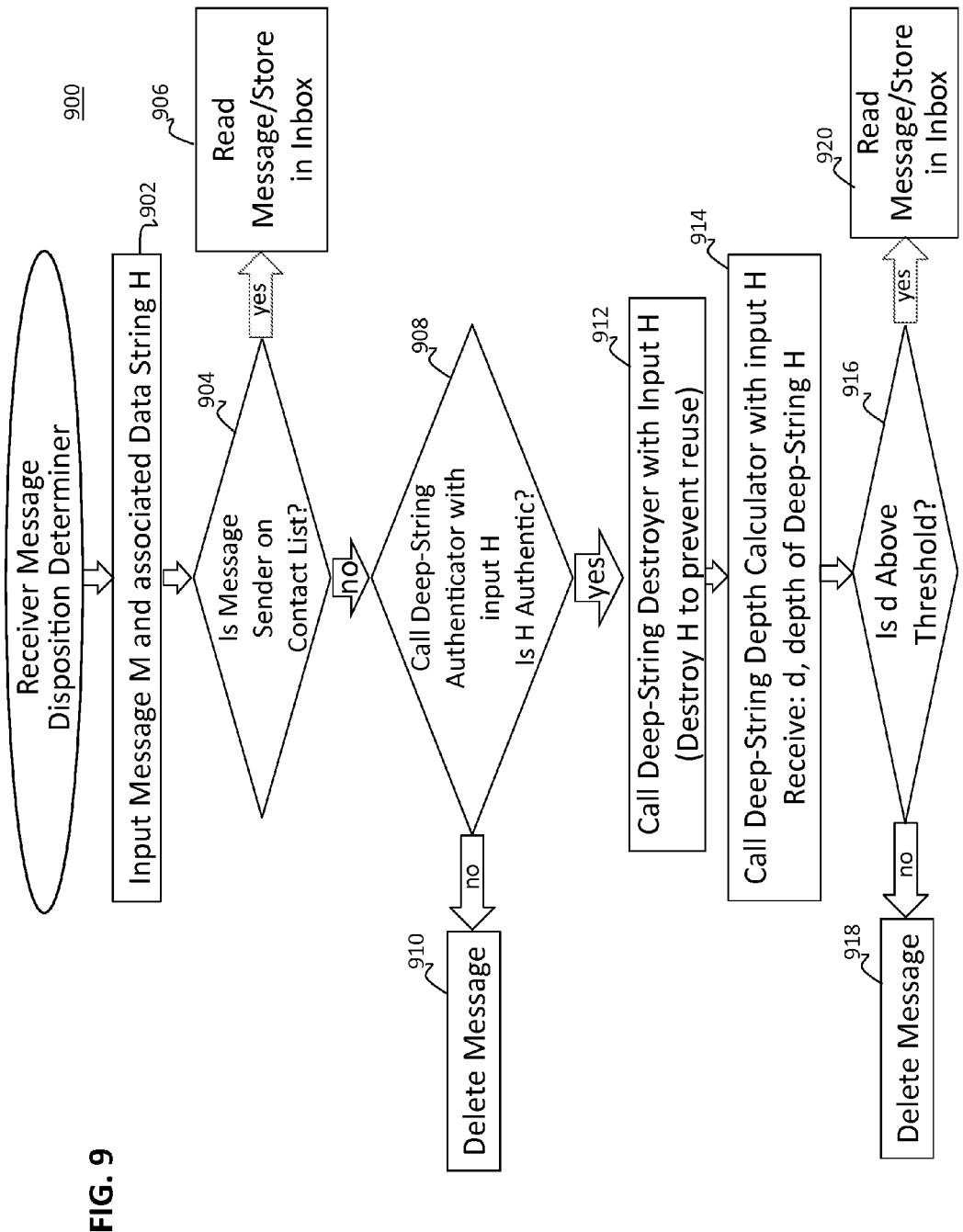
FIG. 9 illustrates a flowchart for a process for receiver message disposition determination in an electronic messaging system, in accordance with one or more embodiments.

FIG. 18 describes the operations, in some embodiments, of the deep-system initializer 506 in flowchart form when a dual-deep-system is being employed. FIG. 19 describes the operations, in some embodiments, of the deep-system initializer 506 in flowchart form when a singular-deep-system is being employed. FIG. 20 describes the operations, in some embodiments, of the deep-string depth calculator 509 in flowchart form when a dual-deep-system is being employed. FIG. 21 describes the operations, in some embodiments, of the deep-string depth calculator 509 in flowchart form when a singular-deep-system is being employed. FIG. 22 describes the operations, in some embodiments, of the deep-string authenticator 510 in flowchart form when a dual-deep-system is being employed. FIG. 23 describes the operations, in some embodiments, of the deep-string authenticator 510 in flowchart form when a singular-deep-system is being employed. FIG. 24 describes the operations, in some embodiments, of the deep-string destroyer 512 in flowchart form when a dual-deep-system is being employed. FIG. 25 describes the operations, in some embodiments, of the deep-string destroyer 512 in flowchart form when a singular-deep-system is being employed. FIG. 28 describes the operation, in some embodiments of the special deep-string generator 518 in flowchart form when a dual-deep-system is being employed. FIG. 9 describes the operation, in some embodiments, of the receiver message disposition determiner 514 in flowchart form.

Message receiver communications component 504 includes operations for receiving messages using one or more network interfaces of the receiver 102. Received messages may include message such as message 200 via a network interface of receiver 102.

Message receiver processing component 502 includes an incoming message receiver processing program. The message receiver processing component performs standard operations of a message receiver, for example, storing the message, organizing messages into files. For example, the standard operations performed by receiver processing component 502 may be similar to those performed by an electronic mail client such as Microsoft Outlook Client™.

In addition, the message receiver processing component 502 may perform operations necessary for operating the deep-string system which may entail invoking or accessing any of the: deep-system initializer 506, deep-string depth calculator 509, deep-string authenticator 510, deep-string destroyer 512, receiver message disposition determiner 514, deep-string sales system 516, special deep-string generator 518, cryptographic keys 520, cryptographic processing 522 or receiver configuration 524.

In an example embodiment, prior to receiving messages, the message receiver processing component 502 calls the deep-system initializer 506. If a dual-deep-system is being used, then the deep-system initializer 506 generates a public key, P, a secret key, S, a depth-series S1, S2, . . . Sw, and initializes a deep-string destroyed list. The public key P, and depth-series S1, S2, . . . , Sw, are made public, the secret key, S, remains private and is stored and made accessible to the message receiver for future use. If a singular-deep-system is being used, then the deep-system initializer 506 chooses a one-way function F, a depth-series S1, S2, . . . , Sw, and initializes a deep-string destroyed list. The one-way function (or an algorithm that computes it), F, and depth-series S1, S2, . . . , Sw, are made public.

Upon receiving a message, for example in format 200 as shown in FIG. 2, the message receiver processing component 502 calls the receiver message disposition determiner 514. The receiver message disposition determiner 514 will determine the disposition of the message. For example, in one possible embodiment the receiver message disposition determiner 514 may access the receiver 102 contact list and if the sender 104 is on the list, may dispose of the message by reading it or storing it in an inbox. If the sender 104 is not on the contact list, then the receiver message disposition determiner 514 may access the deep-string associated with the message, for example, the deep-string part 206 in FIG. 2 and call the deep-string authenticator 510 to determine the authenticity of the deep-string part. If not authentic, then the receiver message disposition determiner 514 may dispose of the message by deleting it. If authentic, then the receiver message disposition determiner 514 may call the deep-string destroyer 512 to assure that the deep-string under consideration cannot be reused in the future. The receiver message disposition determiner 514 may then call the deep-string depth calculator 509 to determine the deep-string-depth, d, of the deep string. The receiver message disposition determiner 514 may then compare the deep-string-depth, d, to a predetermined required depth stored in the receiver configuration 524. If the deep-string-depth, d is below the predetermined required depth (for example, if spam is received) then the receiver message disposition determiner 514 may dispose of the message by deleting it. If the deep-string-depth, d is above the predetermined required depth then the receiver message disposition determiner 514 may dispose of the message by reading it or storing it in an inbox.

In some embodiments the receiver message disposition determiner 514 may calculate whether or not the deep-string depth d is above or below a single predetermined deep-string depth threshold. In some other embodiments, however, the receiver message disposition determiner 514 may determine whether or not the deep-string depth d is above or below each of a plurality of predetermined deep-string depth thresholds. In some embodiments, the receiver message disposition determiner 514 may determine whether or not the deep-string depth d satisfies a plurality of predetermined depth requirements that may or may not be predetermined deep-string depth threshold requirements. In such embodiments, the receiver message disposition determiner 514 may dispose of the message in accordance with the outcomes of all of these determinations. In some other embodiments, there may be multiple deep-strings each of which may or may not be processed to determine the message disposition.

In some embodiments, the message receiver 102 may make some aspects of the receiver message disposition determiner 514 public. For example, indicating the deep-string depth required of a message to avoid automatic deletion. This may deter spammers without the resources to generate deep-strings of such depth or may encourage them to purchase deep-strings of such depth from the deep-string sales system 516 (if available).

Deep-string sales system component 516 operates to generate deep-strings and provide (e.g. by selling) such generated deep-strings to message sender 104, so that the sender may avoid generating deep-strings himself at potentially great effort (e.g. in energy and/or time and or cost).

For example, a sender (e.g., a former spammer) may, before sending a message, obtain a deep-string with a known depth from the deep-string sales system 516. The sender may then form and transmit the massage with the obtained deep-string. The deep-string sales system 516 may generate the deep-strings using, for example, special deep-string generator 518.

Message receiver components 500 may also include cryptographic key component 520, and a cryptographic processing component 522. The cryptographic key component 520 operates to acquire and/or maintain one or more cryptographic keys, such as, for example, one or more keys of one or more public key cryptosystems or to acquire and maintain one or more one-way functions or algorithms to compute them. The cryptographic processing component 522 operates to perform encryption/decryption of data strings in accordance with a selected cryptosystem or operates to compute one or more one-way functions of data strings.

Message receiver components 500 may also include a receiver configuration component 524 which operates to configure parameters associated with receiver operations. For example, one or more predetermined required depths for deep-strings may be configured based upon which a disposition will be made with respect to incoming messages. The configurations may include one or more predetermined required depths for each receiving user or group of users, or a common set of one or more predetermined required depths for all users. For example, larger deep-string-depths may correspond to higher (as in higher importance) service level users, and the lower deep-string-depths may correspond to lower service levels.

Figure 6:
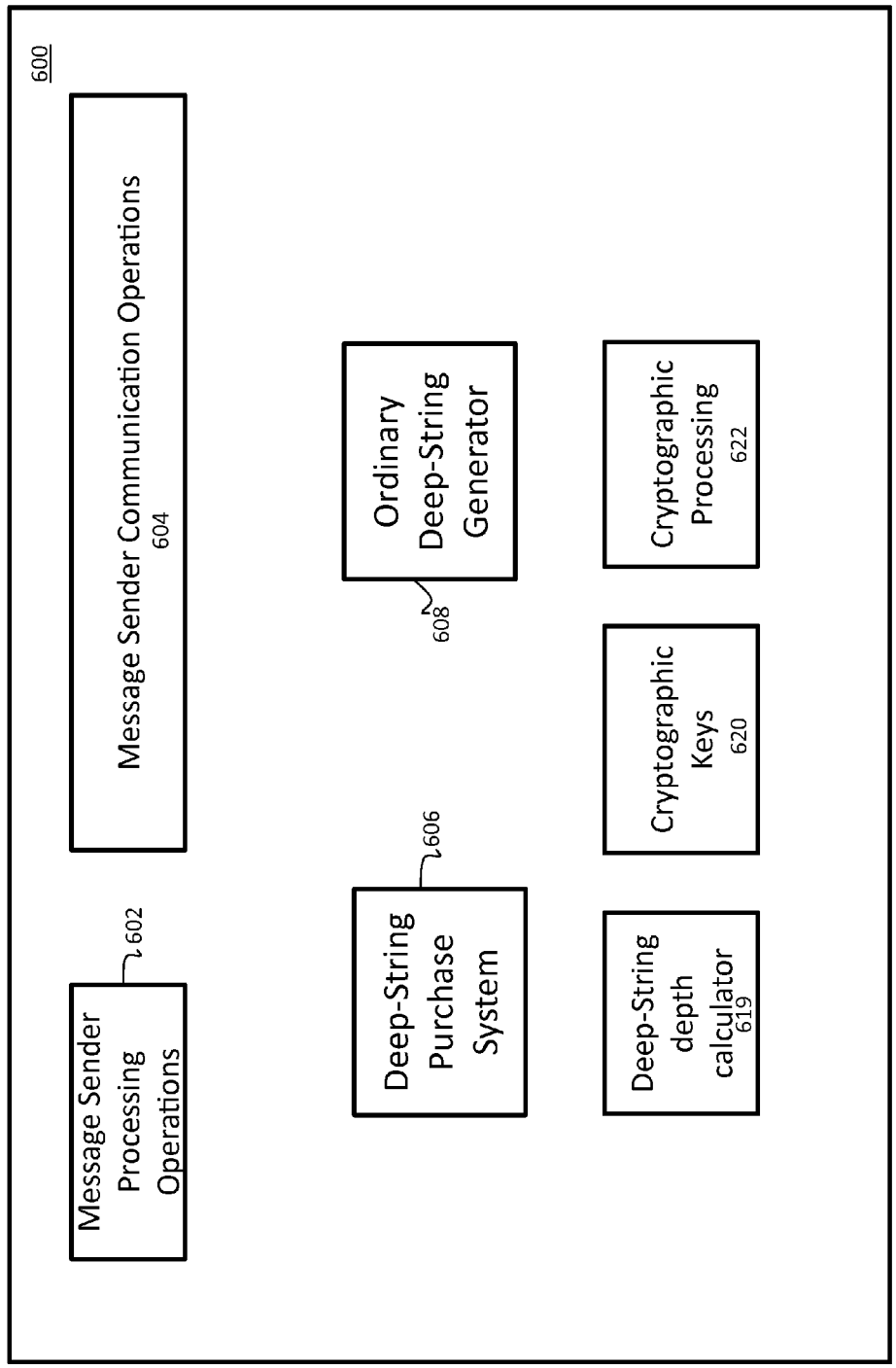
FIG. 6 illustrates some components of a system that is associated with a message sender in an electronic messaging system, in accordance with one or more embodiments.

FIG. 6 illustrates a set of software/firmware/hardware components 600 that is associated with the message sender, such as message sender 104, of a system 100, in accordance with one or more embodiments. The set of components 600 may be included in one or more computing devices, such as, for example, computer 300.

The set of sender components 600 may include a message sender processing component 602, a message communications component 604, a deep-string purchase system 606, an ordinary deep-string generator 608, a deep-string depth calculator 619, cryptographic keys 620, a cryptographic processing component 622. It will be understood that a sender, such as sender 104, may include some of all of the components shown in the set of components 600, and may also include one or more components not shown in the set of components 600.

Figure 26:
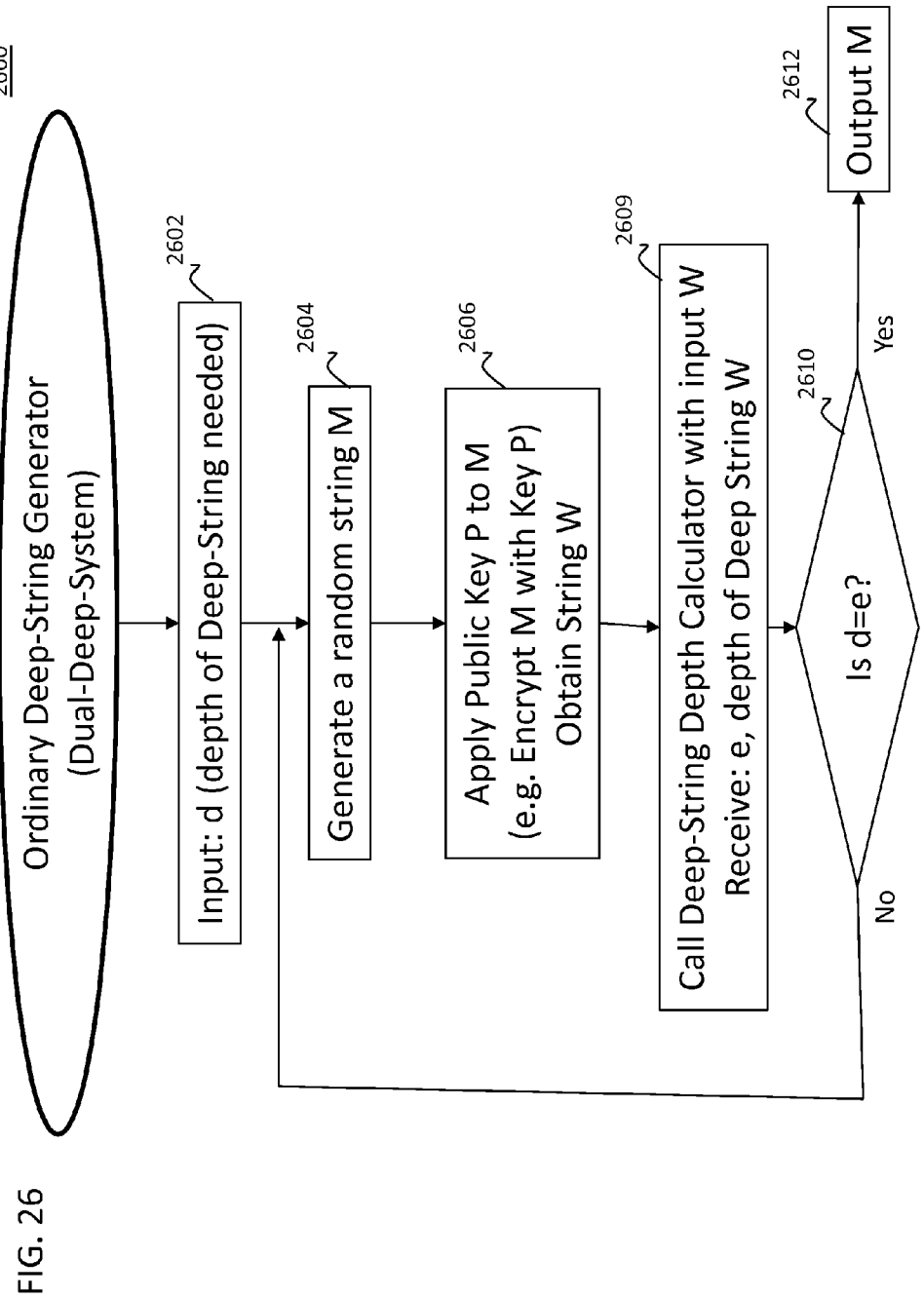
FIG. 26 is a flowchart of a process performed by an ordinary deep-string generator component, when a dual-deep-system is used, according to some embodiments.
Figure 27:
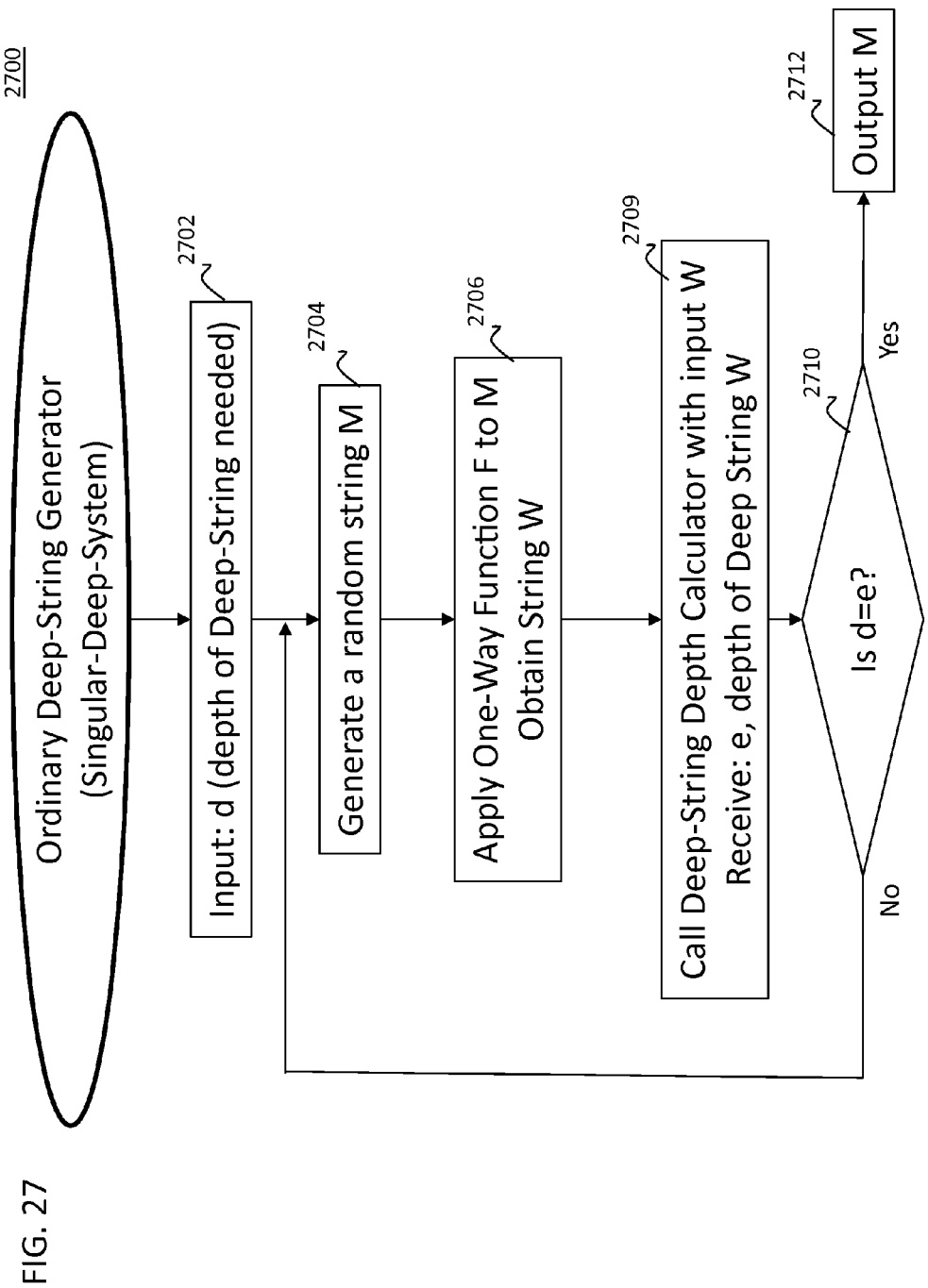
FIG. 27 is a flowchart of a process performed by an ordinary deep-string generator component, when a singular-deep-system is used, according to some embodiments.

FIG. 26 describes the operations, in some embodiments, of the ordinary deep-string generator 608 in flowchart form when a dual-deep-system is being employed. FIG. 27 describes the operations, in some embodiments, of the ordinary deep-string generator 608 in flowchart form when a singular-deep-system is being employed.

Message sender communications component 604 includes operations for sending messages using one or more network interfaces of the sender 104. Sent messages may include message such as message 200.

Message sender processing component 602 performs standard operations of a message sender, for example, editor operations for composing messages, contacts list maintenance. The standard operations performed by sender processing component 602 may be similar to those performed by an electronic mail client such as Microsoft Outlook Client™.

In addition, the message sender processing component 602 may perform operations necessary for operating in a deep-string system environment which may entail invoking or accessing any of: deep-string purchase system 606, ordinary deep-string generator 608, deep-string depth calculator 619, cryptographic keys 620, and cryptographic processing component 622.

In an example embodiment, prior to sending messages, the message sender processing component 602 determines whether to send the message without an associated deep-string or to send the message with an associate deep-string of deep-string-depth d. In the former case, the sender sends the message without associating a deep-string. In the latter case, the sender decides whether to generate the deep-string of depth d by himself using the ordinary deep-string generator 608 or to purchase the deep-string of depth d from another entity (e.g. the intended message receiver or the message server) using the deep-string purchase system 606. If either the ordinary deep-string generator 608 or the deep-string purchase system 606 is used, they may invoke the deep-string depth calculator 619, cryptographic keys 620, cryptographic processing component 622. The choice of deep-string depth d can be made from, for example, from publicly available information about the intended receiver's receiver message disposition determiner 414, and/or publicly available information about the intended server's server message disposition determiner 514.

Figure 7:
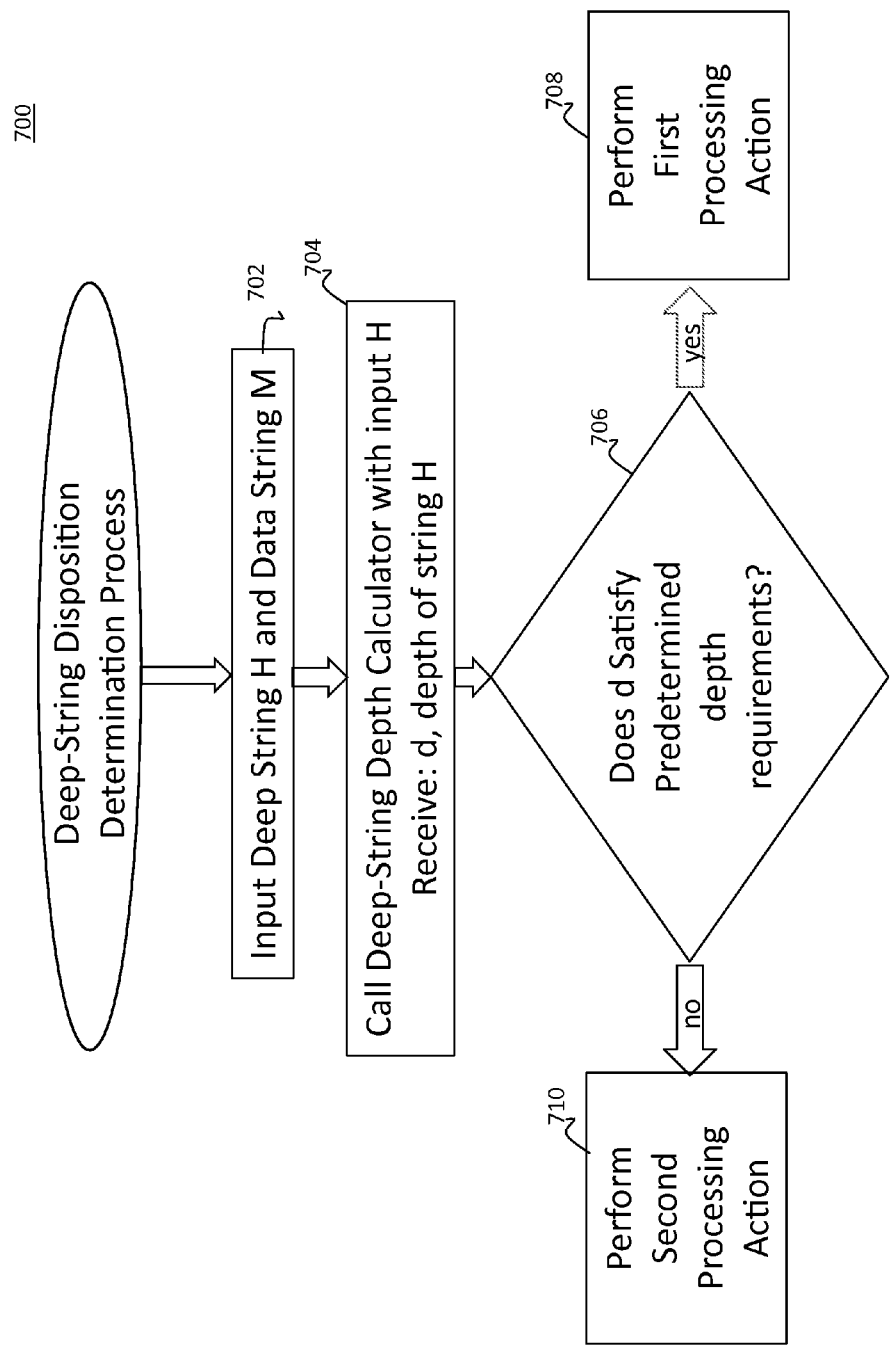
FIG. 7 is a flowchart for a deep-string disposition determination process, in accordance with one or more embodiments.

FIG. 7 is a flowchart illustrating a process 700 for deep-string disposition determination, in accordance with one or more embodiments. It will be understood that a computing device performing process 700 may perform operations 702-710 in the order shown, or in a different order, may omit one or more operations 702-710, or may include additional operations. For example, FIGS. 8, 9, 13 and 17 illustrate deep-string disposition determination processes tailored to specific processes.

Process 700 may be entered on a first computing device, when the first computing device receives a deep-string H and a (possibly empty) data string M from a second computing device. The deep-string H and data string M may correspond to a predetermined format, such as, for example, the format shown in FIG. 2 where the deep-string H may be in the deep-string part and the data string M may be in the message part.

At operation 702, M and H are provided as input to the deep-string disposition determination process.

At operation 704, the deep-string depth of deep-string H is calculated. According to some embodiments, the deep-string depth of H may be calculated by a deep-string depth calculation process, such as process 2000 or 2100 described below in relations to FIGS. 20 and 21. In some embodiments, the deep-string depth of H is calculated by encrypting H using a cryptographic key. In some embodiments, the deep-string depth of H is calculated by applying an algorithm for a one-way function to H. In some embodiments, the deep-string depth will represent the effort (e.g. in energy and/or time and/or dollars) required to obtain (e.g. generate or purchase) the deep-string H by the second computing device.

At operation 706, processing is performed to determine whether the deep-string depth of string H satisfies a predetermined deep-string depth requirement. In some embodiments, the predetermined depth requirement may depend on the data string M. In some embodiments the predetermined depth requirement is a threshold depth requirement where there is a number such that if the deep-string depth of H is greater than or equal to that number then H satisfies the predetermined deep-string depth requirement, and if the deep-string depth of H is less than that number then H does not satisfy the predetermined deep-string depth requirement. Together operations 704 and 706 perform effort processing that determines whether the effort (e.g. in time and/or energy and/or dollars) required to generate or to purchase the string H satisfies predetermined requirements.

If the deep-string-depth of H satisfies the predetermined depth requirements then a first processing action is performed at 708. If the deep-string-depth of H does not satisfy the predetermined depth requirements a second processing action, different from the first processing action, is performed at 710.

In some embodiments, the first computing device uses the process 700 to assure that it performs the first processing action only when the deep-string-depth of the received deep-string H represents a sufficient effort (e.g. dollars and/or energy and/or time) by the second computing device. For example, the predetermined deep-string depth requirement may be configured so as to require a minimum amount of dollars (e.g., a billionth or other fraction of a dollar) and/or time (e.g. a millionth or other fraction of a second, one second, 30 seconds) and/or energy (e.g., a microwatt-hour or other fraction of a watt-hour) that must be expended by the second computing device to warrant the first processing action.

In the embodiments described above with respect to effort processing operations 704 and 704, the determination is with respect to whether or not the deep-string depth of H satisfies a single predetermined depth requirement. In some other embodiments, however, the determination may be with respect to whether or not the deep-string depth of H satisfies a plurality of predetermined depth requirements. In some other embodiments, there may be multiple deep-strings H1, H2, etc. each of which may or may not be processed in making the determination.

FIG. 8 is a flowchart illustrating an example process 800 for server message disposition determination 414 in an electronic message system, in accordance with one or more embodiments. Process 800 may be performed, for example, by message server 106 in order to control the delivery of certain types of messages such as spam messages. It will be understood that, in some embodiments, one or more of the operations 802-820 may not be performed, or may be performed in an order different from that shown, when performing process 800.

After the server message disposition determination process 800 is entered, at operation 802, a message M and associated data string H purported to be a deep-string, is received by process 800. According to some embodiments, M may be a message having a format such as message 200. M may be obtained from the message part 204 of message 200 and H may be obtained from the deep-string part 206 of message 200.

At operation 804, a determination is made as to whether the message sender is on the message receivers contact list. If the message sender is on the message receivers contact list, then the message is forwarded to the message receiver at operation 806. If the message sender is not on the message receivers contact list, then at operation 808, a deep-string authenticator, such as deep-string authenticator 410, is called with H as input. The deep-string authenticator returns an output indicating whether H is authentic or not. If H is found to be not authentic, then at operation 810, the message is deleted and not forwarded to the message receiver. In some other embodiments, if H is found to be not authentic, then at operation 810, the message may be forwarded to the message receiver with an indication that it is spam or an indication that it has an inauthentic deep-string.

If H is found to be authentic, process 800 proceeds to operation 812. At operation 812, a deep-string destroyer, such as deep-string destroyer 412, is called with H as input. The deep-string destroyer 412 adds H to the destroyed list, so that reuse of H can be prevented.

At operation 814, a deep-string depth calculator, such as deep-string depth calculator 409, is called with H as input. The deep-string depth calculator returns the deep-string depth d of H. At operation 816, it is determined whether depth d is above a predetermined threshold. According to some embodiments, the predetermined threshold represents a minimum depth required for forwarding a message to a receiver. The predetermined threshold may be configurable and may be maintained by the server configuration 424. If depth d is determined to be below the predetermined threshold, then at operation 818, the message is deleted and not forwarded to the message receiver. In some other embodiments, if depth d is determined to be below the predetermined threshold, then instead of deleting the message at operation 818, the message may be forwarded to the message receiver with an indication that it is spam or an indication that it has an authentic deep-string of inadequate depth or an indication that it has an authentic deep-string of inadequate depth and that that deep-string-depth is d.

If depth d is determined to be above the predetermined threshold then at operation 820, the message is forwarded to the message receiver. In some other embodiments, if depth d is determined to be above the predetermined threshold, then at operation 820, the message may be forwarded to the message receiver along with the deep-string-depth d.

In the embodiments described above with respect to operation 816, the determination is with respect to whether or not the deep-string depth of H is above or below a single depth threshold. In some other embodiments, however, process 800 may determine whether or not the deep-string depth of H is above or below each of a plurality of configured depth threshold levels. In some embodiments, process 800 may determine whether or not the deep-string depth of H satisfies a plurality of predetermined depth requirements that may or may not be depth threshold requirements. In such embodiments, process 800 may dispose of the message in accordance with the outcomes of all of these determinations. In some other embodiments, there may be multiple deep-strings H1, H2, etc. each of which may or may not be processed to determine the message disposition.

FIG. 9 is a flowchart illustrating a process 900 for receiver message disposition determination 514 in an electronic message system, in accordance with one or more embodiments. Process 900 may be performed, for example, by message receiver 102 in order to control the delivery of certain types of messages such as spam messages. It will be understood that, in some embodiments, one or more of the operations 902-920 may not be performed, or may be performed in an order different from that shown, when performing process 900.

After the receiver message disposition determination process 900 is entered, at operation 902, a message M and associated data string H purported to be a deep-string, is received by process 900. According to some embodiments, M may be a message having a format such as message 200. M may be obtained from the message part 204 of message 200 and H may be obtained from the deep-string part 206 of message 200.

At operation 904, a determination is made as to whether the message sender is on the message receivers contact list. If the message sender is on the message receiver's contact list, then the message is read and/or stored in the inbox of the message receiver 906. If the message sender is not on the message receiver's contact list, then at operation 908, a deep-string authenticator, such as deep-string authenticator 510, is called with H as input. The deep-string authenticator returns an output indicating whether H is authentic or not. If H is found to be not authentic, then at operation 910, the message is deleted and not read or not stored in the inbox of the message receiver. In some other embodiments, if H is found to be not authentic, then at operation 910, the message may be stored in the inbox (or some other folder) of the message receiver with an indication that it is spam or an indication that it has an inauthentic deep-string.

If H is found to be authentic, process 900 proceeds to operation 912. At operation 912, a deep-string destroyer, such as deep-string destroyer 512, is called with H as input. The deep-string destroyer 512 adds H onto the destroyed list, so that reuse of H can be prevented.

At operation 914, a deep-string depth calculator, such as deep-string depth calculator 509, is called with H as input. The deep-string depth calculator returns the deep-string depth d of H. At operation 916, it is determined whether depth d is above a predetermined threshold. According to some embodiments, the predetermined threshold represents a minimum depth required for not deleting a message to a receiver. The predetermined threshold may be configurable and may be maintained by the receiver configuration 524.

If depth d is determined to be below the predetermined threshold, then at operation 918, the message is deleted and not read by or not stored in the inbox of the message receiver. In some other embodiments, if depth d is determined to be below the predetermined threshold, then at operation 918, the message may be stored in the inbox (or some other folder) of the message receiver with an indication that it is spam or an indication that it has an authentic deep-string of inadequate depth or an indication that it has an authentic deep-string of inadequate depth and that that deep-string-depth is d.

If depth d is determined to be above the predetermined threshold then at operation 920, the message is read by or stored in the inbox (or some other folder) of the message receiver. In some other embodiments, if depth d is determined to be equal to or above the predetermined threshold then at operation 920, the message may be given a priority based on the deep-string-depth d.

In the embodiments described above with respect to operation 916, the determination is with respect to whether or not the deep-string depth of H is above or below a single depth threshold. In some other embodiments, however, process 900 may determine whether or not the deep-string depth of H is above or below each of a plurality of configured depth threshold levels. In some embodiments, process 900 may determine whether or not the deep-string depth of H satisfies a plurality of predetermined depth requirements that may or may not be depth threshold requirements. In such embodiments, process 900 may dispose of the access requesting accordance with the outcomes of all of these determinations. In some other embodiments, there may be multiple deep-strings H1, H2, etc. each of which may or may not be processed to determine the access request disposition.

Example Resource Access System

Figure 10:
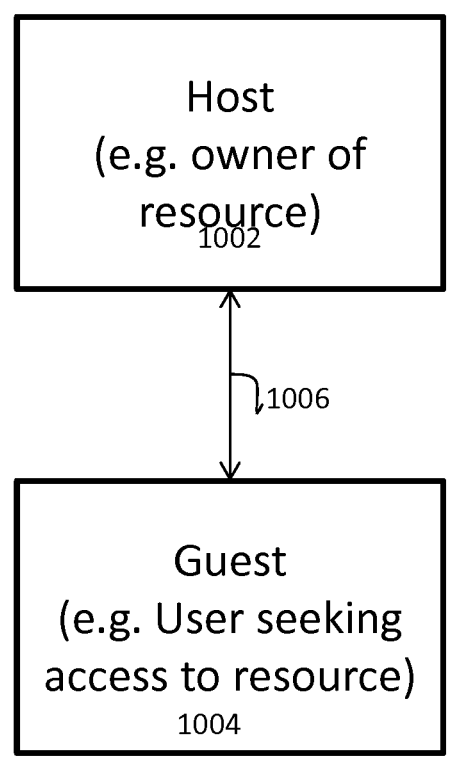
FIG. 10 is a high-level block diagram of a resource access system that includes a host computing system which controls a resource and guest computing system which seeks access to that resource according to one or more embodiments.

FIG. 10 is a high-level block diagram of a resource access system 1000, according to one or more embodiments. System 1000 provides for a host with resources, such as, but not limited to, information, movies, audio and/or video recordings, files, or computers, to control the level of access granted to those resources based upon the deep-string-depth of deep-strings provided by guests seeking access to those resources.

System 1000 includes a host 1002, such as, for example, a web site, or a file server and a guest 1004, such as, for example, a computer seeking access to the host's resources. (e.g., access to the web site or files from the file server). Each of host 1002 and guest 1004 may include a computing system such as computer 300 described in relation to FIG. 3. The guest 1004 and host 1002 can be connected through any type of communication interface 1006, such as, for example, the internet.

Figure 11:
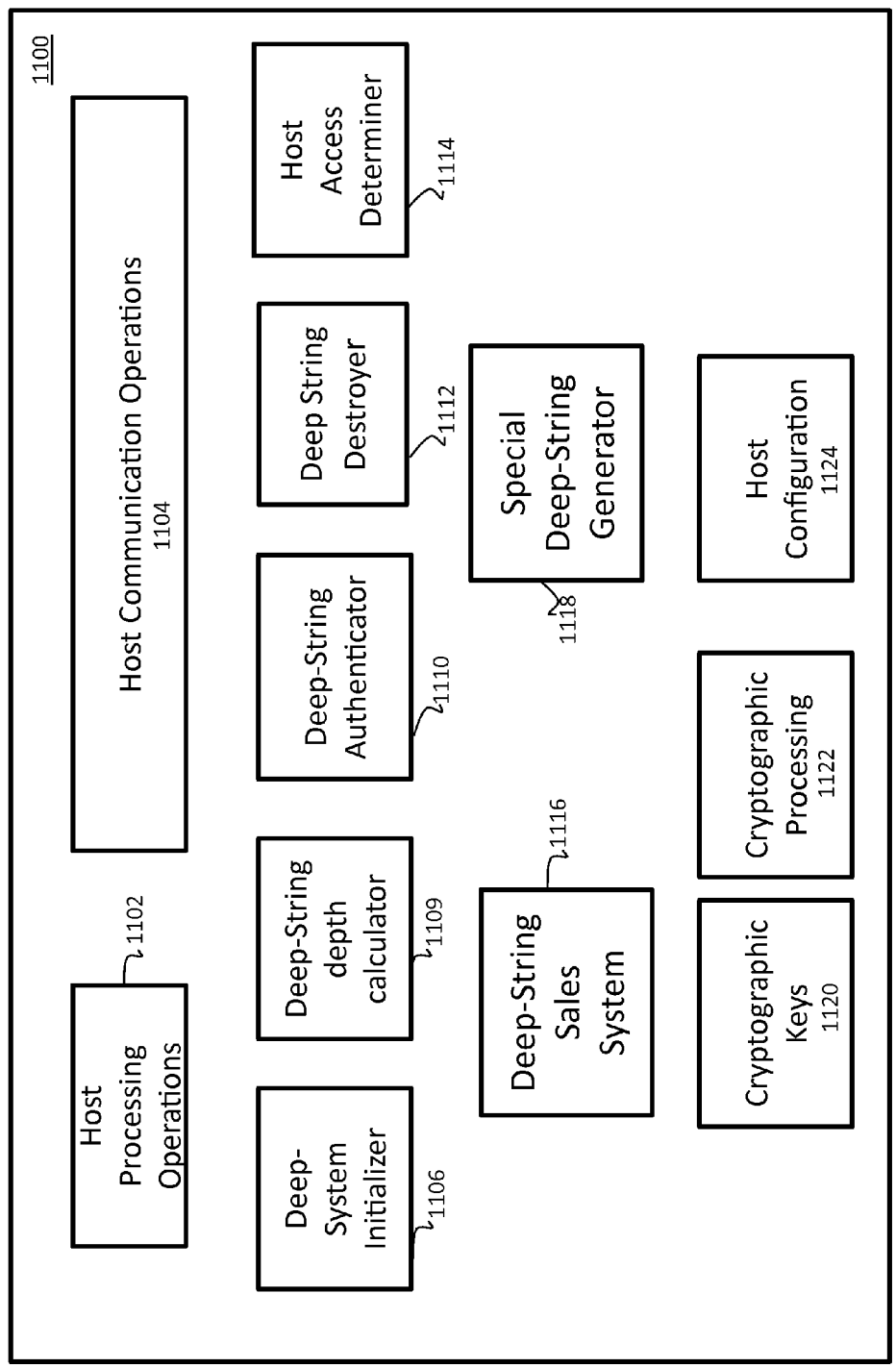
FIG. 11 illustrates a set of components that is associated with a host computing system in a resource access system, in accordance with one or more embodiments.

FIG. 11 illustrates a set of software/firmware/hardware components 1100 that is associated with the host, such as host 1002, of a system 1000, in accordance with one or more embodiments. The set of components 1100 may be included in one or more computing devices, such as, for example, computer 300, operating as host 1002.

The set of host components 1100 may include a host processing component 1102, host communications component 1104, a deep-system initializer 1106, a deep-string depth calculator 1109, a deep-string authenticator 1110, a deep-string destroyer 1112, a host access determiner 1114, a cryptographic key component 1120, a cryptographic processing component 1122, and a host configuration component 1124. Host components 1100 may further include optional components for deep-string operations in dual-string-systems such as deep-string sales system 1116 and special deep-string generator 1118. It will be understood that a host, such as host 1002, may include some of all of the components shown in the set of components 1100, and may also include one or more components not shown in the set of components 1100.

Figure 13:
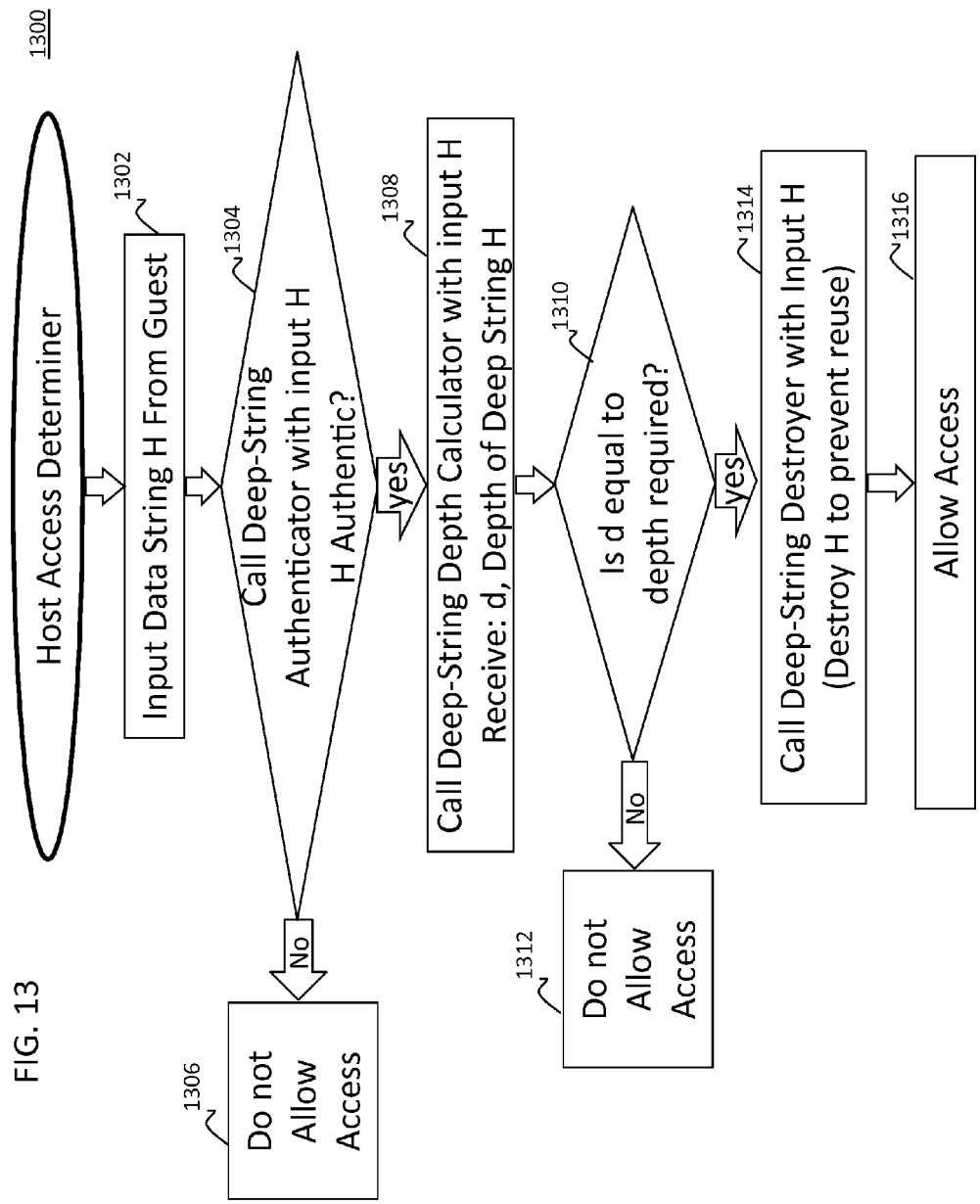
FIG. 13 illustrates a flowchart for a process for host access determination in a resource access system, in accordance with one or more embodiments.

FIG. 18 describes the operations, in some embodiments, of the deep-system initializer 1106 in flowchart form when a dual-deep-system is being employed. FIG. 19 describes the operations, in some embodiments, of the deep-system initializer 1106 in flowchart form when a singular-deep-system is being employed. FIG. 20 describes the operations, in some embodiments, of the deep-string depth calculator 1109 in flowchart form when a dual-deep-system is being employed. FIG. 21 describes the operations, in some embodiments, of the deep-string depth calculator 1109 in flowchart form when a singular-deep-system is being employed. FIG. 22 describes the operations, in some embodiments, of the deep-string authenticator 1110 in flowchart form when a dual-deep-system is being employed. FIG. 23 describes the operations, in some embodiments, of the deep-string authenticator 1110 in flowchart form when a singular-deep-system is being employed. FIG. 24 describes the operations, in some embodiments, of the deep-string destroyer 1112 in flowchart form when a dual-deep-system is being employed. FIG. 25 describes the operations, in some embodiments, of the deep-string destroyer 1112 in flowchart form when a singular-deep-system is being employed. FIG. 28 describes the operation, in some embodiments of the special deep-string generator 1118 in flowchart form when a dual-deep-system is being employed. FIG. 13 describes the operation, in some embodiments, of the host access determiner 1114 in flowchart form.

Host communications component 1104 includes operations for receiving access requests using one or more network interfaces of the host 1002.

Host processing component 1102 includes a host processing program. The host processing component 1102 performs standard operations of a host, for example, organizing web pages, storing membership lists. For example, the standard operations performed by host processing component 1102 may be similar to those performed by a web site such as Amazon.Com or a file server such as Egnyte Cloud File Server™.

In addition, the host processing component 1102 may perform operations necessary for operating the deep-string system which may entail invoking or accessing any of the: deep-system initializer 1106, deep-string depth calculator 1109, deep-string authenticator 1110, deep-string destroyer 1112, host access determiner 1114, deep-string sales system 1116, special deep-string generator 1118, cryptographic keys 1120, cryptographic processing 1122 or host configuration 1124.

In an example embodiment, prior to receiving access requests, the host processing component 1102 calls the deep-system initializer 1106. If a dual-deep-system is being used, then the deep-system initializer 1106 generates a public key, P, a secret key, S, a depth-series S1, S2, . . . Sw, and initializes a deep-string destroyed list. The public key P, and depth-series S1, S2, . . . Sw, are made public, the secret key, S, remains private and is stored and made accessible to the host for future use. If a singular-deep-system is being used, then the deep-system initializer 1106 chooses a one-way function F, a depth-series S1, S2, . . . Sw, and initializes a deep-string destroyed list. The one-way function (or an algorithm that computes it), F, and depth-series S1, S2, . . . Sw, are made public.

Upon receipt of an access requests from a guest, the host processing component 1102 may query the guest to see if they would prefer to use deep-strings to gain access or some other method. If the guest would prefer some other method to gain access, then the host processing component 1102 manages the access request without calling the host access determiner 1114. If the guest would prefer using deep-strings to gain access, then the host processing component 1102 asks the guest for a deep-string, or a deep-string of a particular depth, and when the guest inputs a data string H (purported to be a deep-string), the host processing component 1102 calls the host access determiner 1114 with input H, and possibly ancillary information such as the deep-string-depth needed to gain access to the resource that the guest wants. Configuration 1124 may include a respectively different predetermined required deep-string-depth for each level of access.

The host access determiner 1114 calls the deep-string authenticator 1110 to determine the authenticity of the data string H. If H is not an authentic deep-string, then the host access determiner 1114 may dispose of the access attempt by denying access and notifying the host processing component 1102 of this outcome. If H is an authentic deep-string, then the host access determiner 1114 may call the deep-string depth calculator 1108 to determine the deep-string-depth, d, of the deep string H. The host access determiner 1114 may then compare the deep-string-depth, d, to a predetermined required depth e, for example the deep-string-depth needed to gain access to the resource that the guest wants. For example, e may be provided with the ancillary information received when H was input, or from information stored in the host configuration 1124. If the deep-string-depth, d is not equal to e, then the host access determiner 1114 may dispose of the access attempt by denying access and notifying the host processing component 1102 of this outcome. If the deep-string-depth, d is equal to e then the host access determiner 1114 may dispose of the access attempt by calling the deep-string destroyer 1112 with input H, to ensure that the deep-string H may never be used again, by allowing access and by notifying the host processing component 1102 of this outcome.

In some embodiments the host access determiner 1114 may calculate whether or not the deep-string depth d is above or below a single predetermined deep-string depth threshold. In some other embodiments, however, the host access determiner 1114 may determine whether or not the deep-string depth d is above or below each of a plurality of predetermined deep-string depth thresholds. In some embodiments, the host access determiner 1114 may determine whether or not the deep-string depth d satisfies a plurality of predetermined depth requirements that may or may not be predetermined deep-string depth threshold requirements. In such embodiments, the host access determiner 1114 may dispose of the access request in accordance with the outcomes of all of these determinations. In some other embodiments, there may be multiple deep-strings each of which may or may not be processed to determine the message disposition.

In some embodiments, the host 1002 may make some aspects of the host access determiner 1114 public. For example, indicating the deep-string depth required of a deep-string associated with an access requests, to ensure access to a particular levels of the host's resource. By setting a minimum required depth to avoid automatic denial of access, the host may impose a minimum effort (e.g. in energy and/or time and or cost) for each access by a guest. This may inhibit denial of service attacks since these such attacks sometimes rely on large numbers of guest accesses and the total effort (e.g. in energy and/or time and or cost) of mounting such an attack would be prohibitive. This may also deter access requests from potential guest without the resources to acquire deep-strings of sufficient depth. A potential guest seeking access to a certain host resource may acquire it by acquiring a deep-string of sufficient depth. This may be done by the use of an ordinary deep-string generator, if the potential guest is willing to expend the time, energy and/or expense of generating a deep-string of sufficient depth in this manner. This may also be done by acquiring (e.g. purchasing) a deep-strings of sufficient depth from the deep-string sales system 1116 (if available). The minimum required depth may be configurable within a range of values so as to enable the host to choose the type of guest, based upon the effort (e.g. in energy and/or time and or cost), that guest is willing to expend in order to gain access.

The deep-string sales system component 1116 operates to generate deep-strings and provide (e.g. by selling) such generated deep-strings to potential guests. The deep-string sales system 1116 may generate the deep-strings using, for example, special deep-string generator 1118. The sale of deep-strings in this manner may be become a source of revenue for the host of the resource.

Host components 1100 may also include cryptographic key component 1120, and a cryptographic processing component 1122. The cryptographic key component 1120 operates to acquire and/or maintain one or more cryptographic keys, such as, for example, one or more keys of one or more public key cryptosystems or to acquire and maintain one or more one-way functions or algorithms to compute them. The cryptographic processing component 1122 operates to perform encryption/decryption of data strings in accordance with a selected cryptosystem or operates to compute one or more one-way functions of data strings.

Host components 1100 may also include a host configuration component 1124 which operates to configure parameters associated with host operations. For example, the depth of the dual-string required to access each resource.

Figure 12:
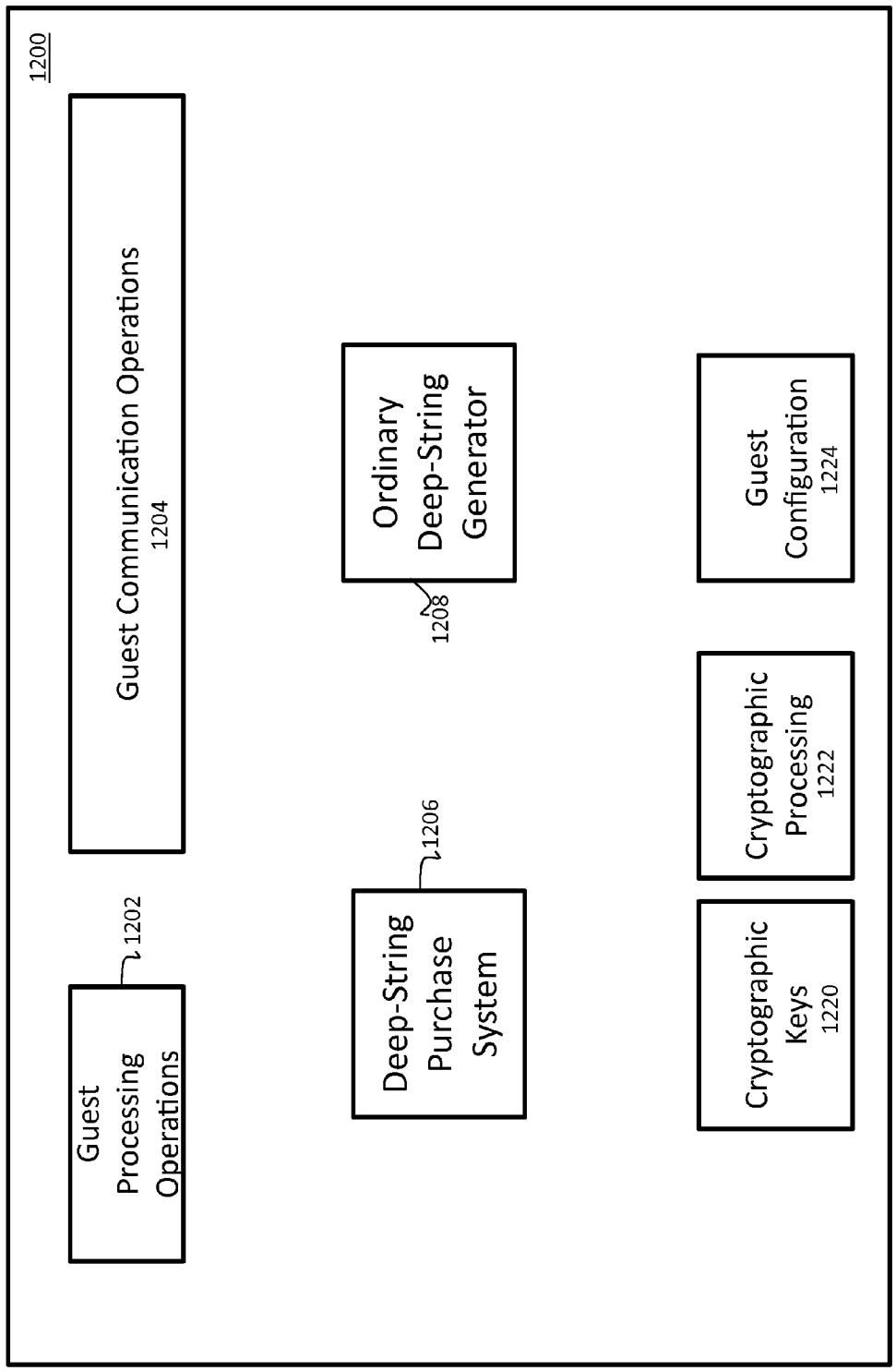
FIG. 12 illustrates a set of components that is associated with the guest computing system in a resource access system, in accordance with one or more embodiments.

FIG. 12 illustrates a set of software/firmware/hardware components 1200 that is associated with a guest, such as guest 1004 of a system 1000, in accordance with one or more embodiments. The set of components 1200 may be included in one or more computing devices, such as, for example, computer 300.

The set of guest components 1200 may include a guest operations component 1202, a guest communications component 1204, a deep-string purchase system 1206, an ordinary deep-string generator 1208, cryptographic key configuration components 1220 for acquiring and maintaining cryptographic keys, cryptographic processing components 1222 for performing cryptographic processing, and configuration components 1224 for enabling user configuration of various guest parameters. It will be understood that a sender, such as guest 1004, may include some of all of the components shown in the set of components 1200, and may also include one or more components not shown in the set of components 1200.

FIG. 26 describes the operations, in some embodiments, of the ordinary deep-string generator 1208 in flowchart form when a dual-deep-system is being employed. FIG. 27 describes the operations, in some embodiments, of the ordinary deep-string generator 1208 in flowchart form when a singular-deep-system is being employed.

Guest communications component 1204 includes operations for communicating with the host using one or more network interfaces.

Guest processing component 1202 performs standard operations of a guest at a host site. The standard operations performed by guest processing component 1202 may be similar to those performed by Microsoft Internet Explorer™.

In addition, the guest processing component 1202 may perform operations necessary for operating in a deep-string system environment which may entail invoking or accessing any of: deep-string purchase system 1206, ordinary deep-string generator 1208, cryptographic keys 1220, cryptographic processing component 1222 and configuration components 1224.

In an example embodiment, prior to seeking access to a host resource, the guest processing component 1202 determines the deep-string depth d of a deep string that will be submitted to the host when seeking access to the host resource. The choice of deep-string depth d can be made from, for example, publicly available information about the host's access determiner. The guest then decides whether to generate the deep-string of depth d by himself using the ordinary deep-string generator 1206 or to purchase the deep-string of depth d from another entity (e.g. the host) using the deep-string purchase system 1206. Having obtained the deep-string of depth d, the string is submitted to the host whereupon the host will determine whether or not to grant access to the resource.

FIG. 13 is a flowchart illustrating an example process 1300 for host access determination 1114 in a resource access system, in accordance with one or more embodiments. Process 1300 may be performed, for example, by host 1002 in order to control the access to the host site or resources controlled by the host. It will be understood that, in some embodiments, one or more of the operations 1302-1316 may not be performed, or may be performed in an order different from that shown, when performing process 1300.

After the host access determination process 1300 is entered, at operation 1302, a data string H purported to be a deep-string, is received by process 1300.

At operation 1304, a deep-string authenticator, such as deep-string authenticator 1110, is called with H as input. The deep-string authenticator returns an output indicating whether H is authentic or not. If H is found to be not authentic, then at operation 1306, the access is denied. If H is found to be authentic, process 1300 proceeds to operation 1308. At operation 1308, a deep-string depth calculator, such as deep-string depth calculator 1109, is called with H as input. The deep-string depth calculator returns the deep-string depth d of H. At operation 1310, it is determined whether depth d is equal to a predetermined number needed for access. The predetermined number may be configurable and may be maintained by the host configuration 1124.

If depth d is determined to be unequal to the predetermined number, then at operation 1312, access is denied.

If depth d is determined to be equal to the predetermined number then at operation 1314, a deep-string destroyer, such as deep-string destroyer 1112, is called with H as input. The deep-string destroyer adds H onto the destroyed list, so that reuse of H can be prevented. Process 1300 then proceeds to operation 1316 at which access is granted.

In the embodiments described above with respect to operation 1310, the determination is with respect to whether or not the deep-string depth of H is equal to a specific depth. In some other embodiments, however, process 1300 may determine whether or not the deep-string depth of H is above or below each of a plurality of configured depth threshold levels. In some embodiments, process 1300 may determine whether or not the deep-string depth of H satisfies a plurality of predetermined depth requirements that may or may not be depth threshold requirements. In such embodiments, process 1300 may dispose of the access request in accordance with the outcomes of all of these determinations. In some other embodiments, there may be multiple deep-strings H1, H2, etc. each of which may or may not be processed to determine the access request disposition.

Example Sales System

Figure 14:
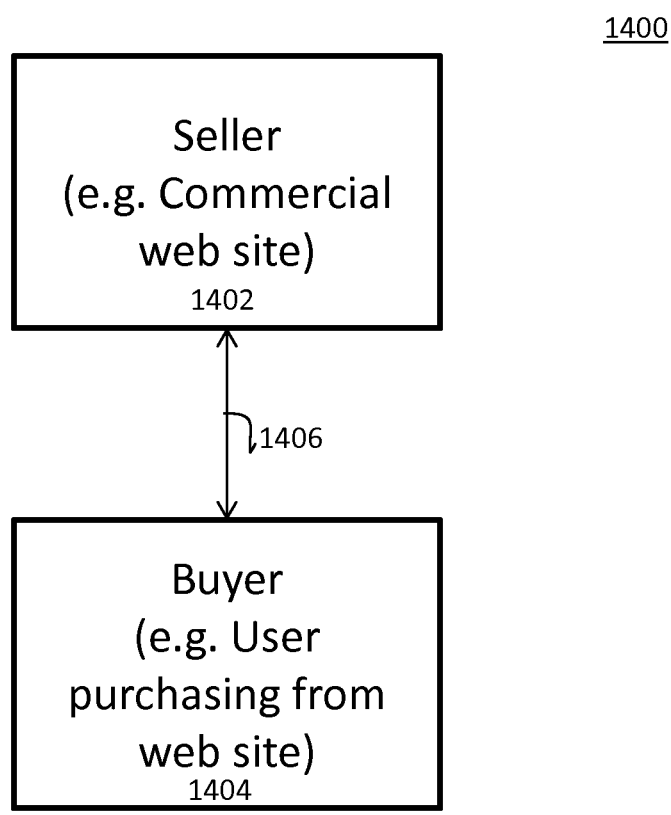
FIG. 14 is a high-level block diagram of a sales system that includes a seller computing system and a buyer computing system according to one or more embodiments.

FIG. 14 is a high-level block diagram of a sales system 1400, according to one or more embodiments. System 1400 provides for a seller to accept from buyers deep-strings of a certain depth as payment for items of value such as information, goods or services.

System 1400 includes a seller 1402, such as, for example, a commercial web site, and a buyer 1404, such as, for example, an online shopper or computer seeking goods services or other items of value from the seller 1402. Each of seller 1402 and buyer 1404 may include a computing system such as computer 300 described in relation to FIG. 3. The buyer 1404 and seller 1402 can be connected through any type of communication interface 1406, such as, for example, the internet.

Figure 15:
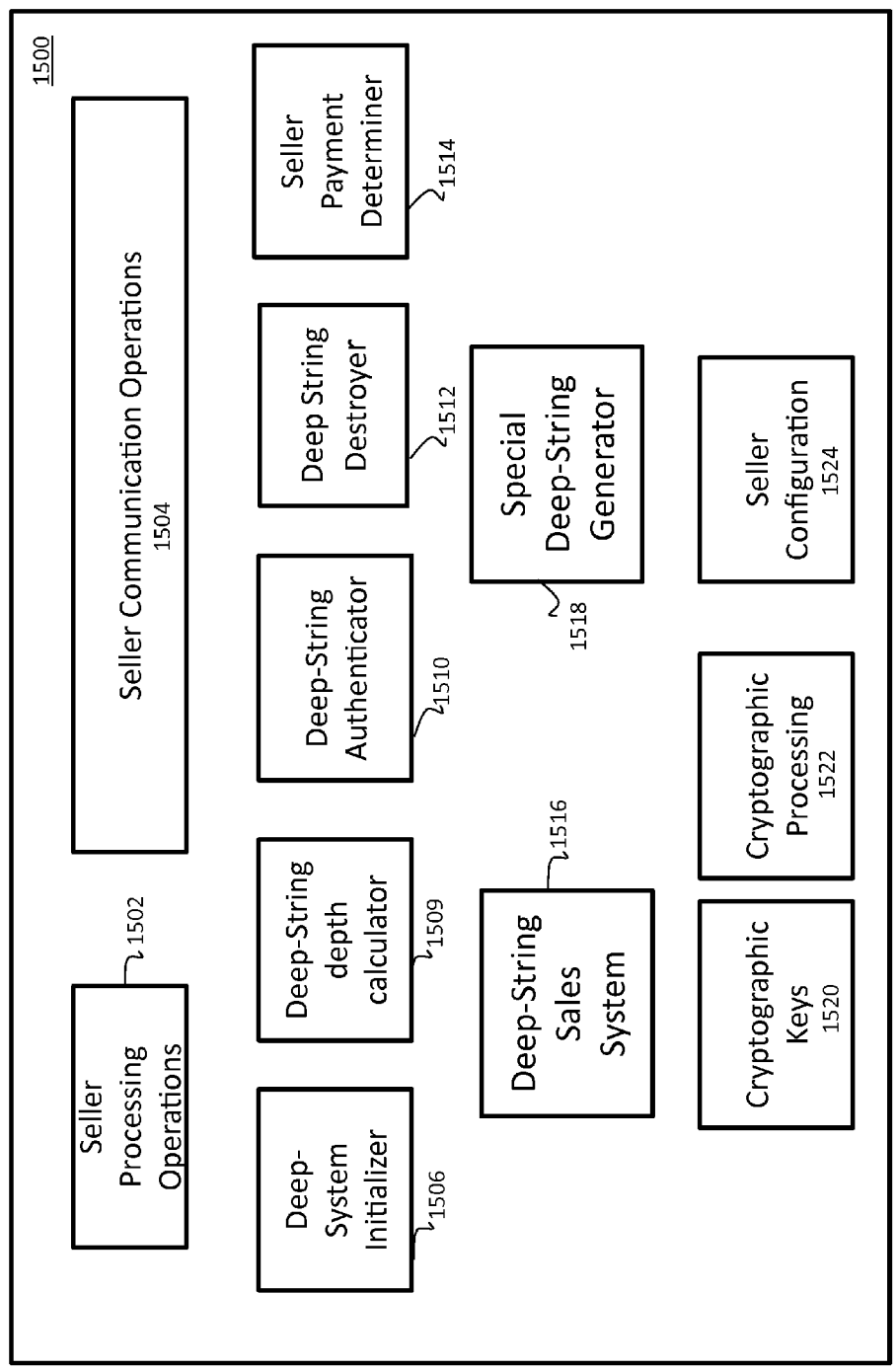
FIG. 15 illustrates a set of components of a system that is associated with a seller computing system in a sales system, in accordance with one or more embodiments.

FIG. 15 illustrates a set of software/firmware/hardware components 1500 that is associated with the seller, such as seller 1402, of a system 1000, in accordance with one or more embodiments. The set of components 1500 may be included in one or more computing devices, such as, for example, computer 300, operating as seller 1402.

The set of seller components 1500 may include a seller processing component 1502, seller communications component 1504, a deep-system initializer 1506, a deep-string depth calculator 1509, a deep-string authenticator 1510, a deep-string destroyer 1512, a seller payment determiner 1514, a cryptographic key component 1520, a cryptographic processing component 1522, and a seller configuration component 1524. Seller components 1500 may further include optional components for deep-string operations in dual-string-systems such as deep-string sales system 1516 and special deep-string generator 1518. It will be understood that a seller, such as seller 1402, may include some of all of the components shown in the set of components 1500, and may also include one or more components not shown in the set of components 1500.

Figure 17:
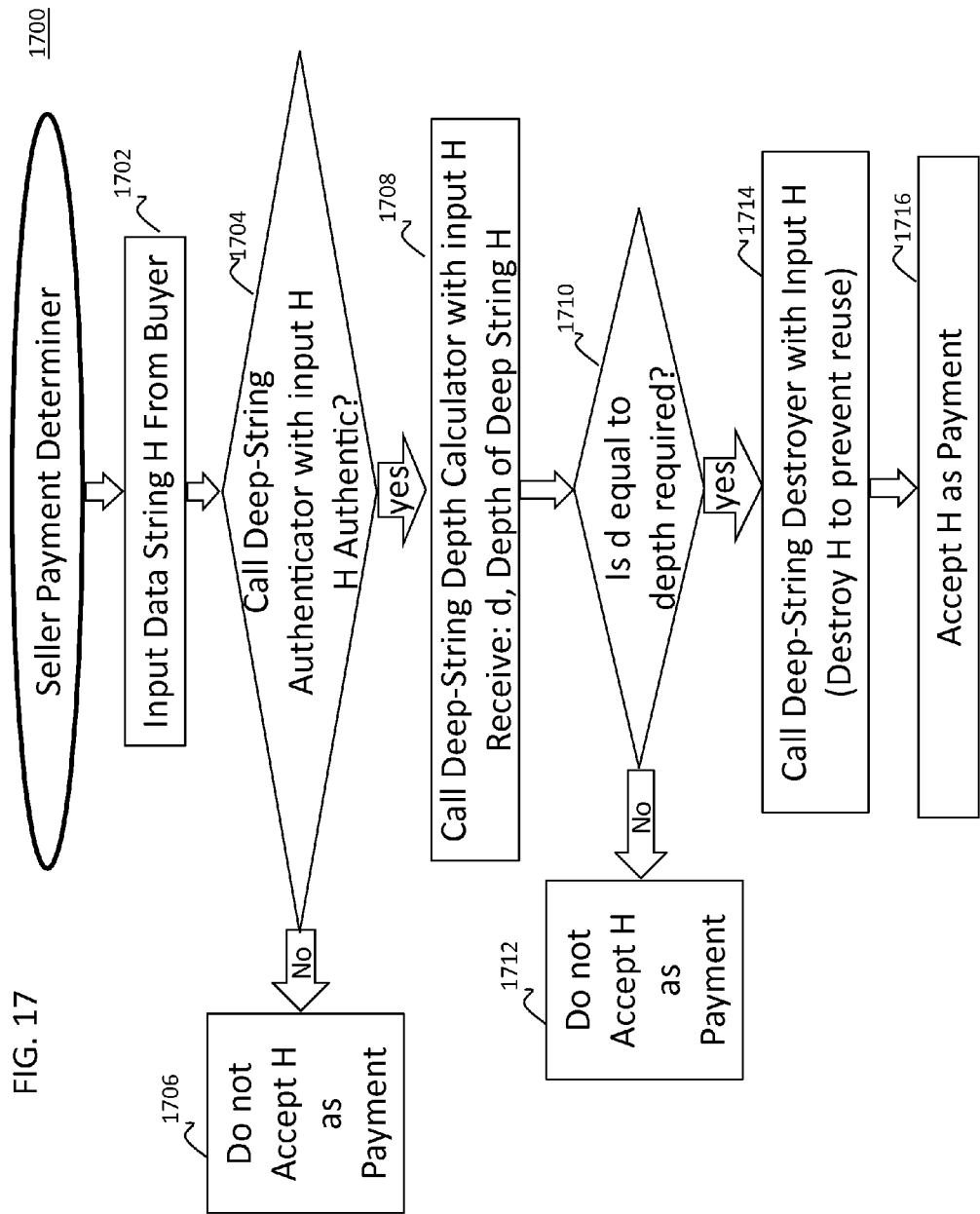
FIG. 17 illustrates a flowchart for a process for seller payment determination in a sales system, in accordance with one or more embodiments.

FIG. 18 describes the operations, in some embodiments, of the deep-system initializer 1506 in flowchart form when a dual-deep-system is being employed. FIG. 19 describes the operations, in some embodiments, of the deep-system initializer 1506 in flowchart form when a singular-deep-system is being employed. FIG. 20 describes the operations, in some embodiments, of the deep-string depth calculator 1509 in flowchart form when a dual-deep-system is being employed. FIG. 21 describes the operations, in some embodiments, of the deep-string depth calculator 1509 in flowchart form when a singular-deep-system is being employed. FIG. 22 describes the operations, in some embodiments, of the deep-string authenticator 1510 in flowchart form when a dual-deep-system is being employed. FIG. 23 describes the operations, in some embodiments, of the deep-string authenticator 1510 in flowchart form when a singular-deep-system is being employed. FIG. 24 describes the operations, in some embodiments, of the deep-string destroyer 1512 in flowchart form when a dual-deep-system is being employed. FIG. 25 describes the operations, in some embodiments, of the deep-string destroyer 1512 in flowchart form when a singular-deep-system is being employed. FIG. 28 describes the operation, in some embodiments of the special deep-string generator 1518 in flowchart form when a dual-deep-system is being employed. FIG. 17 describes the operation, in some embodiments, of the seller payment determiner 1514 in flowchart form.

Seller communications component 1504 includes operations for receiving payment requests using one or more network interfaces of the seller 1402.

Seller processing component 1502 includes a seller processing, program. The seller processing component 1502 performs standard operations of a seller, for example, organizing web pages, storing price lists. For example, the standard operations performed by the seller processing component 1502 may be similar to those performed by an online shopping web site such as Amazon.Com.

In addition, the seller processing component 1502 may perform operations necessary for operating the deep-string system which may entail invoking or accessing any of the: deep-system initializer 1506, deep-string depth calculator 1509, deep-string authenticator 1510, deep-string destroyer 1512, seller payment determiner 1514, deep-string sales system 1516, special deep-string generator 1518, cryptographic keys 1520, cryptographic processing 1522 or seller configuration 1524.

The deep-string sales system component 1516 operates to generate deep-strings and provide (e.g. by selling) such generated deep-strings to potential buyers. The deep-string sales system 1516 may generate the deep-strings using, for example, special deep-string generator 1518. The sale of deep-strings in this manner may be seen as an electronic equivalent of the sale of gift cards from retail stores.

Seller components 1500 may also include cryptographic key component 1520, and a cryptographic processing component 1522. The cryptographic key component 1520 operates to acquire and/or maintain one or more cryptographic keys, such as, for example, one or more keys of one or more public key cryptosystems or to acquire and maintain one or more one-way functions or algorithms to compute them. The cryptographic processing component 1522 operates to perform encryption/decryption of data strings in accordance with a selected cryptosystem or operates to compute one or more one-way functions of data strings.

Seller components 1500 may also include a seller configuration component 1524 which operates to configure parameters associated with seller operations. For example, the predetermined required depth of the deep-string required to purchase each item that is for sale. For example, for each of a plurality of items which has a different sale price, a corresponding respective predetermined required depth may be configured.

Figure 16:
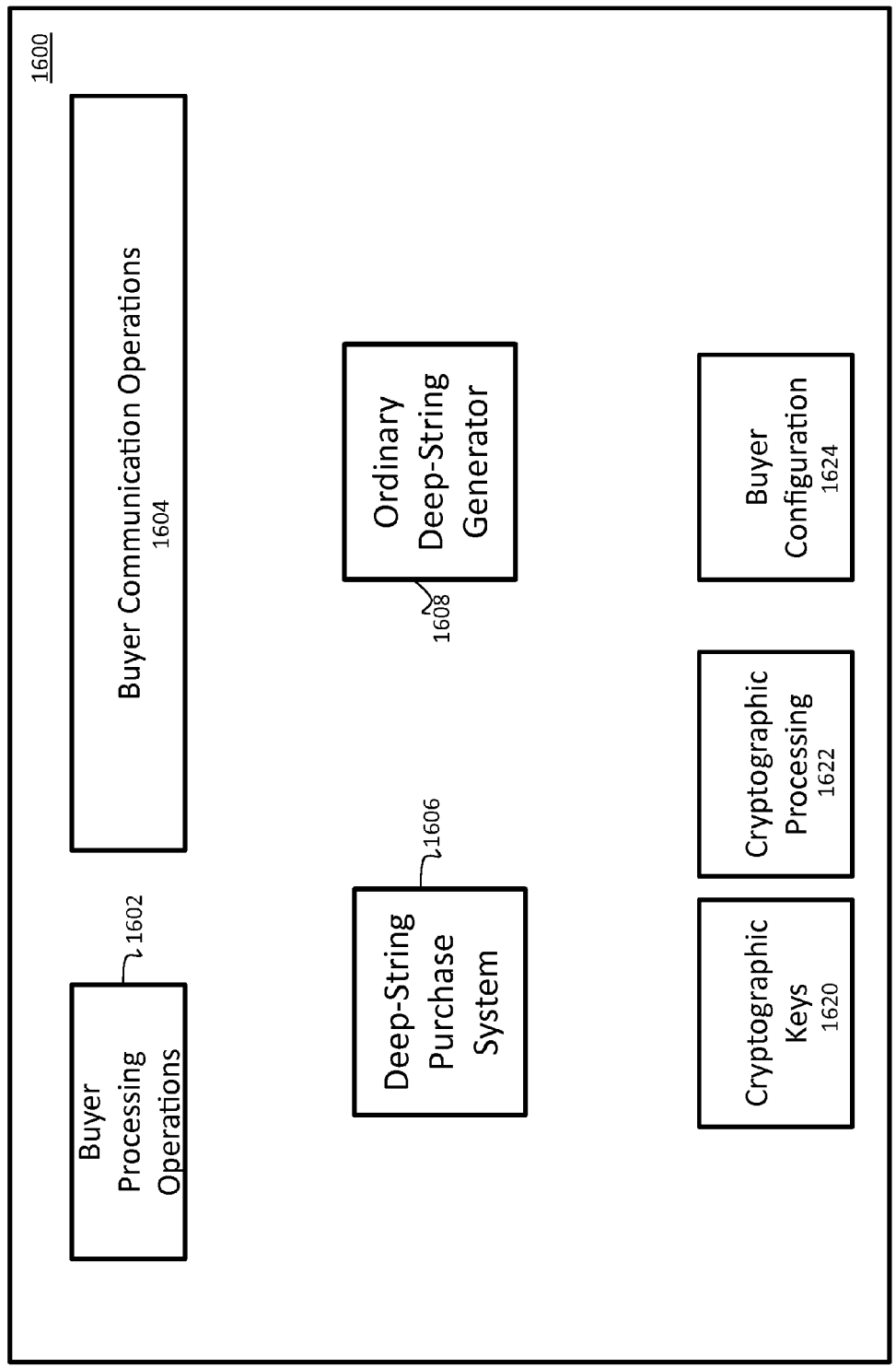
FIG. 16 illustrates a set of components of a system that is associated with the buyer computing system in a sales system, in accordance with one or more embodiments.

FIG. 16 illustrates a set of software/firmware/hardware components 1600 that is associated with a buyer, such as buyer 1404 of a system 1400, in accordance with one or more embodiments. The set of components 1600 may be included in one or more computing devices, such as, for example, computer 300.

The set of buyer components 1600 may include a buyer operations component 1602, a buyer communications component 1604, a deep-string purchase system 1606, an ordinary deep-string generator 1608, cryptographic key configuration components 1620 for acquiring and maintaining cryptographic keys, cryptographic processing components 1622 for performing cryptographic processing, and buyer configuration components 1624 for enabling user configuration of various buyer parameters. It will be understood that a buyer, such as guest 1404, may include some of all of the components shown in the set of components 1600, and may also include one or more components not shown in the set of components 1600.

FIG. 26 describes the operations, in some embodiments, of the ordinary deep-string generator 1608 in flowchart form when a dual-deep-system is being employed. FIG. 27 describes the operations, in some embodiments, of the ordinary deep-string generator 1608 in flowchart form when a singular-deep-system is being employed.

Buyer communications component 1604 includes operations for communicating with the seller using one or more network interfaces.

Buyer processing component 1602 performs standard operations of a buyer at a seller site. The standard operations performed by buyer processing component 1602 may be similar to those performed by Microsoft Internet Explorer™.

In addition, the buyer processing component 1602 may perform operations necessary for operating in a deep-string system environment which may entail invoking or accessing any of: deep-string purchase system 1606, ordinary deep-string generator 1608, cryptographic keys 1620, cryptographic processing component 1622 and configuration components 1624.

In an example embodiment, prior to receiving payment requests, the seller processing component 1502 calls the deep-system initializer 1506. If a dual-deep-system is being used, then the deep-system initializer 1506 generates a public key, P, a secret key, S, a depth-series S1, S2, . . . Sw, and initializes a deep-string destroyed list. The public key P, and depth-series S1, S2, . . . Sw, are made public, the secret key, S, remains private and is stored and made accessible to the seller for future use. If a singular-deep-system is being used, then the deep-system initializer 1506 chooses a one-way function F, a depth-series S1, S2, . . . Sw, and initializes a deep-string destroyed list. The one-way function (or an algorithm that computes it), F, and depth-series S1, S2, . . . Sw, are made public.

Upon receipt of a purchase request from a buyer, the seller processing component 1502 may query the buyer to see if they would prefer to pay using deep-strings or some other method. If the buyer would prefer some other method of payment, then the seller processing component 1502 manages the payment request without accessing the seller payment determiner 1514.

If the buyer would prefer to pay using deep-strings, then the buyer processing component 1602 determines the deep-string depth d of a deep string that will be proffered to the seller as payment. The choice of deep-string depth d can be made from, for example, publicly available information (e.g. a price list) about the seller's access determiner. The buyer then decides whether to generate the deep-string of depth d by himself using the ordinary deep-string generator 1608 or to purchase the deep-string of depth d from another entity (e.g. the seller) using the deep-string purchase system 1606. Having obtained the deep-string of depth d, the string H is submitted to the seller as a proffered deep-string payment. The seller processing component 1502 calls the seller payment determiner 1514 with input H, and possibly ancillary information such as the price of the items being purchased or the names of the items being purchased. The seller payment determiner 1514 determines whether to accept deep-string H as payment or reject deep-string H as payment.

FIG. 17 is a flowchart illustrating an example process 1700 for a seller payment determination process 1514 in a sales system, in accordance with one or more embodiments. It will be understood that, in some embodiments, one or more of the operations 1702-1716 may not be performed, or may be performed in an order different from that shown, when performing process 1700.

After the seller payment determination process 1700 is entered, at operation 1702, a data string H purported to be a deep-string, is received by process 1700.

At operation 1704, a deep-string authenticator, such as deep-string authenticator 1510, is called with H as input. The deep-string authenticator returns an output indicating whether H is authentic or not. If H is found to be not authentic, then at operation 1706, the payment is rejected. If H is found to be authentic, process 1700 proceeds to operation 1708. At operation 1708, a deep-string depth calculator, such as deep-string depth calculator 1509, is called with H as input. The deep-string depth calculator returns the deep-string depth d of H. At operation 1710, it is determined whether depth d is equal to a predetermined number (e.g. a price in deep-strings of certain depth of the items being purchased). The predetermined number may be configurable and may be maintained by the host configuration 1524.

If depth d is determined to be unequal to the predetermined number, then at operation 1712, payment is rejected.

If depth d is determined to be equal to the predetermined number then at operation 1714, a deep-string destroyer, such as deep-string destroyer 1512, is called with H as input. The deep-string destroyer adds H onto the destroyed list, so that reuse of H can be prevented. Process 1700 then proceeds to operation 1716 at which payment is accepted.

In the embodiments described above with respect to operation 1710, the determination is with respect to whether or not the deep-string depth of H is equal to a specific depth. In some other embodiments, however, process 1700 may determine whether or not the deep-string depth of H is above or below each of a plurality of configured depth threshold levels. In some embodiments, process 1700 may determine whether or not the deep-string depth of H satisfies a plurality of predetermined depth requirements that may or may not be depth threshold requirements. In such embodiments, process 1700 may dispose of the proffered payment in accordance with the outcomes of all of these determinations. In some other embodiments, there may be multiple deep-strings H1, H2, etc. each of which may or may not be processed to determine the payment disposition.

In some embodiments, if at operation 1710 it is determined that the depth d is greater than the predetermined required depth, then H may be accepted as payment and a deep-string with a deep-string-depth corresponding to the balance amount may be returned to the buyer.

In some embodiments, the seller 1402 may make some aspects of the seller payment determiner 1514 public. For example, indicating the deep-string depth required for the purchase of each item.

Example Processes Used in Some Embodiments

FIG. 18 is a flowchart of an initializing process 1800 performed by a deep-system initializer component, such as, deep-system initializer components 406, 506, 1106 and 1506. In the illustrated embodiment, process 1800 is performed to initialize a dual-deep-system.

After entering process 1800, at operation 1802, a public key cryptosystem is selected. Choices for public key cryptosystems may include, for example, and without limitation, cryptosystems such as RSA, Elliptic Curve Cryptosystem (ECC), El Gamal encryption. Merkle-Hellman cryptosystem, and digital signature cryptosystems, such as, digital signature algorithm (DSA), elliptic curve digital signature algorithm (ECDSA), El Gamal signature algorithm, Schnorr signature algorithm, Rabin signature algorithm, GMR (Goldwasser-Micali-Rivest) signature algorithm, Pointcheval-Stern signature algorithm, Chaum's undeniable signatures, pairing based digital signature schemes, BLS (Boneh-Lynn-Shacham) based digital signature scheme, and others.

At operation 1804, key generation is performed. The generated keys include at least one key pair which includes a public key P and a secret key S. U.S. Pat. No. 4,405,829 to Rivest, Shamir and Adleman (the inventor of the subject matter of this application) describes the RSA technique in detail, and is hereby incorporated by reference in its entirety. "A Method for Obtaining Digital Signatures and Public-Key Cryptosystems" by Rivest, Shamir and Adleman, Communications of the ACM 21 (2): 120-126, 1978, provides further details regarding the properties and implementation of digital signatures and public-key cryptosystems, and is hereby incorporated by reference in its entirety.

At operation 1806, one or more depth-series are configured. For example depth-series S1, S2, . . . , Sw may be formed with each depth series Sj having a set of deep-strings of depth j. For example, according to an embodiment, where the receiving user has an RSA-key pair public key <E, N> and secret key <D, N> where the public key is published, Sj may include any bit string G such that G is less than or equal to N and the least positive residue of GE MOD(N) is less than $N/10^j$ and greater than $N/10^{(j+1)}$ Choosing a random number (or equivalently, a bit string) $V \in Z_{>1}^{\leq N}$ and computing $V^E$ Mod(N) has approximately $9/10^{(j+1)}$ of a chance of producing a deep-string of deep-string-depth j. Hence the expected number of modular exponentiations to produce a deep-string of deep-string of depth 9 is a little more than about one billion, which imposes a substantial effort (e.g. in energy and/or time and or cost). On the other hand, those who possess the secret key can choose a number (or equivalently, a bit string) $W \in Z_{>1}^{\leq N}$ such that W is less than $N/10^j$ and greater than $N/10^{(j+1)}$ and calculate $W^D$ Mod(N) to produce a deep-string of depth j after just one modular exponentiation.

At operation 1808, the deep-string destroyed list is initialized, for example, to the empty list. In some embodiments, the deep-string destroyed list can be initialized to a non-empty list.

At operation 1810, the public key P and depth-series are made public. In some embodiments, publishing the key and depth-series involves depositing the key and depth-series (e.g. or description thereof) in a manner that it can be accessed by all Internet users. For example, the key and depth-series may be stored in a web server or FTP server such that it may be provided to any entity upon the receipt of a request.

After operation 1810 is completed, the initialization of the deep-system is complete, and process 1800 ends.

FIG. 19 is a flowchart of another initializing process 1900 performed by a deep-system initializer component, such as, deep-system initializer components 406, 506, 1106 and 1506. In the illustrated embodiment, process 1900 is performed to initialize a singular-deep-system.

After entering process 1900, at operation 1902, a one-way function F is selected. Choices for the one-way function may include, for example, and without limitation, cryptographic hash functions such as SHA0, SHA1, SHA2, SHA3, SHA256, MD5, RIPEMD-160, a Universal hash function or any other cryptographic hash function deemed to be secure at the time of implementation. Choices for the one-way function also may include, for example one-way functions derived from public key cryptosystems, factoring, discrete logarithm problems or elliptic curves.

At operation 1904, one or more depth-series are configured. For example depth-series S1, S2, . . . , Sw may be formed with each depth series Sj having a set of deep-strings of depth j.

At operation 1906, the deep-string destroyed list is initialized, for example, to the empty list. In some embodiments, the deep-string destroyed list can be initialized to a non-empty list.

At operation 1908, the one-way function F and depth-series are made public.

After operation 1908 is completed, the initialization of the deep-system is complete, and process 1900 ends.

FIG. 20 is a flowchart of a process 2000 performed by a deep-string-depth calculator component, such as, deep-string depth calculators 409, 509, 1109 and 1509. In the illustrated embodiment, process 2000 is performed in a dual-deep-system.

After entering process 2000, at operation 2002, an input data string H is received.

At operation 2004, public key P is applied to data string H (e.g., encrypt H with P) in order to obtain encrypted string G.

At operation 2006, a depth d is determined such that G is in Sd.

In another embodiment if there is no d such that G is in Sd, then d is set equal to 0.

At operation 2008, the determined depth d is output. Thereafter, process 2000 ends.

FIG. 21 is a flowchart of a process 2100 performed by a deep-string-depth calculator component, such as, deep-string depth calculators 409, 509, 1109 and 1509. In the illustrated embodiment, process 2100 is performed in a singular-deep-system.

After entering process 2100, at operation 2102, an input data string H is received.

At operation 2104, the one-way function F is applied to data string H in order to obtain string G.

At operation 2106, a depth d is determined such that G is in Sd.

In another embodiment if there is no d such that G is in Sd, then d is set equal to 0.

At operation 2108, the determined depth d is output.

Thereafter, process 2100 ends.

FIG. 22 is a flowchart of a process 2200 performed by a deep-string-authenticator component, such as, deep-string authenticators 410, 510, 1110 and 1510. In the illustrated embodiment, process 2200 is performed in a dual-deep-system.

After entering process 2200, at operation 2202, an input data string H is received.

At operation 2204, public key P is applied to data string H (e.g., encrypt H with P) in order to obtain encrypted string G.

At operation 2206, it is determined whether G is on the destroyed list. If yes, then at operation 2209 an output is returned indicating that H is not authentic. If the determination at 2206 indicates that H is not on the destroyed list, then at operation 2210, an output is returned indicating that H is authentic.

After either operation 2209 or 2210, process 2200 terminates.

FIG. 23 is a flowchart of a process 2300 performed by a deep-string-authenticator component, such as, deep-string authenticators 410, 510, 1110 and 1510. In the illustrated embodiment, process 2300 is performed in a singular-deep-system.

After entering process 2300, at operation 2302, an input data string H is received.

At operation 2304, one-way function F is applied to data string H in order to obtain string G.

At operation 2306, it is determined whether G is on the destroyed list. If yes, then at operation 2309 an output is returned indicating that H is not authentic. If the determination at 2306 indicates that H is not on the destroyed list, then at operation 2310, an output is returned indicating that H is authentic.

After either operation 2309 or 2310, process 2300 terminates.

FIG. 24 is a flowchart of a process 2400 performed by a deep-string-destroyer component, such as, deep-string destroyers 412, 512, 1112 and 1512. In the illustrated embodiment, process 2400 is performed in a dual-deep-system.

After entering process 2400, at operation 2402, an input data string H is received.

At operation 2404, public key P is applied to data string H (e.g., encrypt H with P) in order to obtain encrypted string G.

At operation 2406, G is added to the destroyed list, and process 2400 terminates.

FIG. 25 is a flowchart of a process 2500 performed by a deep-string-authenticator component, such as, deep-string authenticators 410, 510, 1110 and 1510. In the illustrated embodiment, process 2500 is performed in a singular-deep-system.

After entering process 2500, at operation 2502, an input data string H is received.

At operation 2504, one-way function F is applied to data string H in order to obtain string G.

At operation 2506, G is added to the destroyed list, and process 2500 terminates.

FIG. 26 is a flowchart of a process 2600 performed by an ordinary deep-string generator component, such as, ordinary deep-string generators 608, 1208 and 1608. In the illustrated embodiment, process 2600 is performed in a dual-deep-system.

After entering process 2600, at operation 2602, a depth d is received as input. Depth d corresponds to the required depth for the deep-string to be generated.

At operation 2604, a random string M is generated.

At operation 2606, public key P is applied to M (e.g., M is encrypted with P) in order to obtain encrypted string W.

At operation 2608, a deep-string depth calculator (such as deep-string depth calculator 2000) is called with input W. The deep-string depth calculator returns e representing the depth of deep-string W.

At operation 2610, it is determined whether e is equal to the desired depth d. If yes, at operation 2612 M is output as a valid deep-string of depth d, and the process terminates.

If, at operation 2610, it is determined that e is not equal to d, then process 2600 returns to operation 2604 to generated a new random string M.

FIG. 27 is a flowchart of a process 2700 performed by an ordinary deep-string generator component, such as, ordinary deep-string generators 608, 1208 and 1608. In the illustrated embodiment, process 2700 is performed in a singular-deep-system.

After entering process 2700, at operation 2702, a depth d is received as input. Depth d corresponds to the required depth for the deep-string to be generated.

At operation 2704, a random string M is generated.

At operation 2706, one-way function F is applied to M in order to obtain string W.

At operation 2708, a deep-string depth calculator (such as deep-string depth calculator 2100) is called with input W. The deep-string depth calculator returns e representing the depth of deep-string W.

At operation 2710, it is determined whether e is equal to the desired depth d. If yes, at operation 2712, M is output as a valid deep-string of depth d, and the process terminates.

If, at operation 2710, it is determined that e is not equal to d, then process 2700 returns to operation 2704 to generated a new random string M.

FIG. 28 is a flowchart of a process 2800 performed by a special deep-string generator component, such as, special deep-string generators 418, 518, 1118, 1518. In the illustrated embodiment, process 2800 is performed in a dual-deep-system.

After entering process 2800, at operation 2802, a depth d is received as input. Depth d corresponds to the required depth for the deep-string to be generated.

At operation 2804, a random string R is generated in Sd.

At operation 2806, secret key S is applied to R (e.g., R is encrypted with S) in order to obtain encrypted string M.

At operation 2808, M is output, and process 2800 terminates.

It will be appreciated that as used herein, the terms system, subsystem, service, logic circuitry, and the like may be implemented as any suitable combination of software, hardware, firmware, and/or the like. It also will be appreciated that the storage device locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine-implemented method comprising:
using a hardware processor configured to accept or reject an incoming digital string by receiving a digital string;
effort processing said digital string with a predetermined cryptographic process to determine a deep-string-depth of the digital string and to determine if the deep-string-depth satisfies a predetermined requirement of string generation effort;
accepting said digital string and performing a first predetermined process if said effort processing determines that said deep-string-depth satisfies said predetermined requirement of string generation effort; and
rejecting said digital string and performing a different second predetermined process if said effort processing determines that said deep-string-depth does not satisfy said predetermined requirement of string generation effort.

2. The machine-implemented method of claim 1, wherein said predetermined requirement of string generation effort is defined by an amount of energy required to generate said digital string.

3. The machine-implemented method of claim 2, wherein the amount of energy is a non deminimis amount of energy.

4. The machine-implemented method of claim 2, wherein the amount of energy is in excess of one microwatt-hour.

5. The machine-implemented method of claim 1, wherein said predetermined requirement of string generation effort is defined by an amount of time required to generate said digital string.

6. The machine-implemented method of claim 5, wherein the amount of time is a non deminimis amount of time.

7. The machine-implemented method of claim 5, wherein the amount of time is in excess of one microsecond.

8. The machine-implemented method of claim 1, wherein said predetermined requirement of string generation effort is defined by a monetary cost required to generate said digital string.

9. The machine-implemented method of claim 8, wherein the monetary cost is a non deminimis amount of money.

10. The machine-implemented method of claim 8, wherein the monetary cost is in excess of a billionth of a dollar.

11. The machine-implemented method of claim 1, wherein said digital string comprises at least 2048 bits.

12. The machine-implemented method of claim 1, wherein said digital string comprises at least 256 bits.

13. The machine-implemented method of claim 1, wherein said predetermined cryptographic process comprises applying a one-way function.

14. The machine-implemented method of claim 13, wherein said one-way function comprises at least one of SHA0, SHA1, SHA2, SHA3, SHA256, MD5, RIPEMD-160, a universal hash function, a secure cryptographic hash function, a one-way functions derived from a public key cryptosystem, a one-way function derived from factoring, a one-way function derived from discrete logarithm problems, or a one-way function based upon from elliptic curves.

15. The machine-implemented method of claim 13, wherein said one-way function is made public.

16. The machine-implemented method of claim 1, wherein said predetermined cryptographic process comprises applying a key of a predetermined cryptographic system to said digital string.

17. The machine-implemented method of claim 16, wherein the predetermined cryptographic system includes at least one of RSA, Elliptic Curve Cryptosystem (ECC), El Gamal encryption, Merkle-Hellman cryptosystem, digital signature algorithm (DSA), elliptic curve digital signature algorithm (ECDSA), El Gamal signature algorithm, Schnorr signature algorithm, Rabin signature algorithm, GMR (Goldwasser-Micali-Rivest) signature algorithm, Pointcheval-Stern signature algorithm, Chaum's undeniable signatures, pairing based digital signature schemes, and BLS (Boneh-Lynn-Shacham) based digital signature scheme.

18. The machine-implemented method of claim 16, wherein said predetermined cryptographic process comprises a public key cryptosystem.

19. The machine-implemented method of claim 18, wherein said predetermined cryptographic process comprises the RSA public key cryptosystem.

20. The machine-implemented method of claim 18, wherein a pair of keys of the public key cryptosystem consisting of a public key and a secret key are obtained and the secret key is not made public.

21. The machine-implemented method of claim 18, wherein a pair of keys of the public key cryptosystem consisting of a public key and a secret key are obtained and the public key is made public and the secret key is not made public.

22. The machine-implemented method of claim 16, wherein said key is made public.

23. The machine-implemented method of claim 1, wherein said digital string is associated with one or more other data strings.

24. The machine-implemented method of claim 23, wherein the one or more other data strings comprise a plurality of other data strings, and wherein said first predetermined process comprises passing a first subset of the plurality of other data strings onward to an addressee and said second predetermined process comprises passing a different subset of said plurality of other data strings onward to an addressee.

25. The machine-implemented method of claim 23, wherein said one or more other data strings comprise a message and an address and said first predetermined process comprises passing said message onward to said address and said second predetermined process comprises not passing said message onward to said address.

26. The machine-implemented method of claim 23, wherein said one or more other data strings comprise a message and an address and said first predetermined process comprises passing said message onward to said address and said second predetermined process comprises passing said message onward to said address marked as including or potentially including spam.

27. The machine-implemented method of claim 23, wherein said one or more other data strings comprise a message and an address and said first predetermined process comprises passing said message onward to said address and said second predetermined process comprises passing said message onward to said address with a priority determined by said deep-string depth of said digital string.

28. The machine-implemented method of claim 23, wherein said one or more other data strings comprise at least an email message, an encoded voice message, a text message, and/or a video message.

29. The machine-implemented method of claim 23, wherein said predetermined requirement of string generation effort at least in part depends on said other data strings.

30. The machine-implemented method of claim 1, wherein said first predetermined process comprises permitting a sender of said digital string to access a resource and said second predetermined process comprises not permitting said sender access to said resource.

31. The machine-implemented method of claim 30, wherein said resource is a web-site.

32. The machine-implemented method of claim 31, wherein said resource is a page on the web-site.

33. The machine-implemented method of claim 30, wherein said resource is a file server.

34. The machine-implemented method of claim 30, wherein said resource is a file on a file server.

35. The machine-implemented method of claim 30, wherein a level of the access is determined according to the value of the deep-string-depth.

36. The machine-implemented method of claim 30, wherein a duration of access is determined according to the value of the deep-string-depth.

37. The machine-implemented method of claim 1, wherein said first predetermined process comprises accepting said digital string as a payment and said second predetermined process comprises not accepting said digital string as a payment.

38. The machine-implemented method of claim 1, wherein said first predetermined process comprises accepting said digital string as a payment for information, goods or services available on the internet and said second predetermined process comprises not accepting said digital string as a payment for information, goods or services available on the internet.

39. The machine-implemented method of claim 1, wherein said predetermined requirement of string generation effort is a predetermined depth threshold requirement, and wherein there is a predetermined number such that the deep-string-depth of said digital string satisfies the predetermined requirement if and only if it is greater than or equal to said predetermined number.

40. The machine-implemented method of claim 1, wherein if said digital string satisfies said predetermined requirement of string generation effort then an entry corresponding to the said digital string is added to a list of destroyed data strings.

41. The machine-implemented method of claim 1, wherein said predetermined requirement of string generation effort includes an authenticity requirement, and wherein said digital string satisfies the authenticity requirement only if an entry corresponding to the said digital string is not present in a list of destroyed data strings.

42. The machine-implemented method of claim 1, wherein there is a predetermined set of sets $S_1, S_2, \ldots S_n$, where n is an integer and the said digital string is determined to have deep-string-depth d if and only processing said digital string with said predetermined cryptographic process produces an element in Sd.

43. The machine-implemented method of claim 42, said set of sets S1, S2, . . . Sn is made public.

44. The machine-implemented method of claim 1, wherein all or part of said effort processing is made public.

45. The machine-implemented method of claim 1, wherein all or part of the predetermined cryptographic process is made public.

46. The machine-implemented method of claim 45, wherein said digital string is generated by a process including (a) generating a random digital string, (b) applying the predetermined cryptographic process to the generated random digital string to determine its depth, and (c) repeating steps (a) and (b) until a desired deep-string-depth is obtained and selecting the last generated random digital string as the digital string.

47. The machine-implemented method of claim 1, wherein the predetermined cryptographic process is a public key cryptosystem, and wherein there is a predetermined set of sets S1, S2, . . . Sn and said digital string is determined to have depth d if and only if encrypting said digital string with a public key produces an element of set Sd.

48. The machine-implemented method of claim 47, wherein said digital string is generated by a process including (a) determining a depth d that said digital string is to have, (b) calculating a second digital string in the set Sd, and (c) making said digital string the result of applying a secret key corresponding to the public key to the second digital string.

49. The machine-implemented method of claim 47, further comprising providing a plurality of pre-generated digital strings available for purchase after being generated by a process including (a) determining a depth d that a pre-generated digital string is to have, (b) calculating a second digital string in the set Sd, and (c) applying a secret key corresponding to the public key to the second digital string to obtain a pre-generated digital string.

50. The machine-implemented method of claim 1, wherein said digital string is obtained by a sender of the digital string by purchase.

51. The machine-implemented method according to claim 1, wherein said deep-string-depth increases in proportion to at least one of an estimated amount of time or an estimated energy or an estimated monetary cost required to generate said digital string from publically available information.

52. The machine-implemented method according to claim 1, wherein said deep-string-depth increases in proportion to at least one of an estimated amount of time or an estimated amount of energy or an estimated monetary cost required to generate a string of said deep-string-depth by (a) generating a random digital string and calculating its deep-string-depth, (b) repeating (a) until said deep-string depth is obtained and (c) defining the string generated to be the last random digital string generated.

53. A system, comprising:
a receiver computing device having at least one processor configured to perform operations comprising:
receiving a first digital string;
applying a predetermined cryptographic process or a predetermined one way function to the digital string to generate a second digital string;
calculating, from the second digital string, a deep-string-depth of the first digital string;
determining whether the calculated deep-string-depth of the first digital string satisfies a predetermined deep-string-depth requirement corresponding to a predetermined requirement of string generation effort;
selecting, based upon the result of said determining, a processing action from a set of possible different processing actions; and
causing the selected processing action to be performed.

54. A system, according to claim 53, where in the at least one processor is further configured to determine whether the first digital string is authentic.

55. The system according to claim 54, wherein the at least one processor is further configured to: if the first digital string is not determined as being authentic or is not determined as having a deep-string-depth satisfying the predetermined deep-string-depth requirement, perform one of (a) not allowing the sender of the first digital string access to resources controlled by the receiver computing device, or (b) allowing the sender of the first digital string limited access to resources controlled by the receiver computing device.

56. The system according to claim 54, wherein the at least one processor is further configured to: if the first digital string is determined as being authentic and is determined as having a deep-string-depth satisfying the predetermined deep-string-depth requirement, allow a sender of the first digital string access to resources controlled by the receiver computing device.

57. The system according to claim 54, wherein the at least one processor is configured to: if the first digital string is not determined as being authentic or is not determined as having a deep-string-depth satisfying the predetermined deep-string-depth requirement, not accepting the first digital string as payment for information, goods or services for sale by the receiver computing device.

58. The system according to claim 54, wherein the at least one processor is configured to: if the first digital string is determined as being authentic and is determined as having a deep-string-depth satisfying the predetermined deep-string-depth requirement, accepting the first digital string as payment for information, goods or services for sale by the receiver computing device.

59. The system, according to claim 54, further comprising a memory in which a list of destroyed strings is stored, and wherein determining whether the first digital string is authentic includes determining whether an entry corresponding to said second digital string does not occur on the list of destroyed strings stored in the memory.

60. The system according to claim 53 wherein the at least one processor is further configured to receive, in addition to the first digital string, one or more other digital strings associated with the first digital string.

61. The system, according to claim 53, wherein the at least one processor is further configured to:
receive, in addition to the first digital string, one or more other digital strings associated with the first digital string; and
determine whether the first digital string is authentic.

62. The system according to claim 61, wherein the one or more other data strings include a message and an address of a computing device, and wherein the at least one processor is further configured to: if the first digital string is not determined as being authentic or is not determined as having a deep-string-depth satisfying the predetermined deep-string-depth requirement, perform one of (a) discarding the message without sending it to the addressed computing device, or (b) marking the message as possibly spam and sending the message to the addressed computing device.

63. The system according to claim 61, wherein the one or more other data strings include a message and an address of a computing device and wherein the at least one processor is further configured to: if the first digital string is determined as being authentic and is determined as having a deep-string-depth satisfying the predetermined deep-string-depth requirement, sending the message to the addressed computing device.

64. The system, according to claim 53 further comprising a memory, and wherein the selected processing action includes adding an entry corresponding to said second digital string to a list of destroyed strings stored in the memory.

65. The system according to claim 53, further comprising a memory storing a plurality of pre-generated digital strings of a plurality of deep-string-depths, and
wherein the at least one processor is further configured to:
receive, from a second computing device, a request for a digital string of a particular deep-string-depth;
select a pre-generated digital string of requested deep-string depth from the plurality of pre-generated digital strings in the memory; and
send the selected digital string to the second computing device.

66. The system according to claim 65, wherein said plurality of pre-generated digital strings are obtained by a process including (a) determining a deep-string-depth d that a digital string is to have, (b) calculating a digital string of deep-string-depth d, and (c) applying a secret key of a public cryptosystem to the calculated string.

67. The system according to claim 53, wherein calculating, from the second digital string, a deep-string-depth of the first digital string comprises:
calculating a value for the deep-string-depth such that the value increases as a function of at least one of an estimated amount of time or an estimated amount of energy or an estimated monetary cost expended by the sender computing device in generating the first digital string by a process including (a) generating a random digital string (b) calculating a deep-string-depth of the generated random string, and (c) repeating steps (a) and (b) until the deep-string depth of the generated random string corresponds to the calculated value and selecting the last generated random string as the first digital string.

68. A non-transitory computer readable storage medium having stored therein instructions that, when executed by at least one processor of a receiver computing device, causes the receiver computing device to perform operations comprising:
receiving a first digital string;
applying a predetermined cryptographic process or a predetermined one way function to the first digital string to generate a second digital string;
calculating, from the second digital string, a deep-string-depth of the first digital string;
determining whether the calculated deep-string-depth of the first digital string satisfies a predetermined deep-string-depth requirement corresponding to a predetermined requirement of string generation effort;
selecting, based upon the result of said determination, a processing action from a set of possible different processing actions; and
causing the selected processing action to be performed.

69. The non-transitory computer readable storage medium according to claim 68, wherein the first digital string does not satisfy the predetermined deep-string-depth requirement if an entry corresponding to said second digital string does not occur on a list of destroyed strings stored in a memory.

70. The non-transitory computer readable storage medium according to claim 68, wherein the operations further comprise, if the first digital string is not determined as having a deep-string-depth satisfying the predetermined deep-string-depth requirement, performing one of (a) not allowing a sender of the first digital string access to resources controlled by the receiver computing device or (b) allowing the sender of the first digital string limited access to resources controlled by the receiver computing device.

71. The non-transitory computer readable storage medium according to claim 68, wherein to the operations further comprise, if the first digital string is determined as satisfying the predetermined deep-string-depth requirement, allowing the sender of the first string access to resources controlled by the receiver computing device.

72. The non-transitory computer readable storage medium according to claim 68, wherein the operations further comprise: if the first digital string is not determined as satisfying the predetermined deep-string-depth requirement, not accepting the first digital string as payment for information, goods or services for sale by the receiver computing device.

73. The non-transitory computer readable storage medium according to claim 68, wherein to the operations further include: if the first digital string is determined as satisfying the predetermined deep-string-depth requirement, accepting the first digital string as payment for information, goods or services for sale by the receiver computing device.

74. The non-transitory computer readable storage medium according to claim 68, wherein the operations further comprise:
receiving, in addition to a first digital string, one or more other digital strings associated with the first digital string.

75. The non-transitory computer readable storage medium according to claim 74, wherein the other data strings include a message and an address of a computing device, and wherein the operations further comprise: if the first digital string is not determined as being authentic or is not determined as having a deep-string-depth satisfying the predetermined deep-string-depth requirement, perform one of (a) discarding the message without sending it to the addressed computing device, or (b) marking the message as possibly spam and sending the message to the addressed computing device.

76. The non-transitory computer readable storage medium according to claim 74, wherein the other data strings include a message and an address of a computing device, and wherein to the operations further comprise: if the first digital string is determined as satisfying the predetermined deep-string-depth requirement, sending the message to the addressed computing device.

77. The non-transitory computer readable storage medium according to claim 74, wherein the selected processing action includes adding an entry corresponding to the second digital string to a list of destroyed strings stored in a memory.

78. The non-transitory computer readable storage medium according to claim 68, wherein said processor includes a memory storing a plurality of pre-generated digital strings of a plurality of deep-string-depths; and
wherein the operations further comprise:
receiving, from a second computing device, a request for a digital string of a particular deep-string-depth;

selecting a pre-generated digital string of requested deep-string depth from the plurality of digital strings in the memory; and sending the selected digital string to the second computing device.

79. The non-transitory computer readable storage medium according to claim 78, wherein said plurality of pre-generated digital strings of a plurality of deep-string-depths are obtained by a process including (a) determining a deep-string-depth d that a digital string is to have, (b) calculating a digital string of deep-string-depth d, and (c) applying a secret key of a public cryptosysterm to the calculated digital string.

80. The non-transitory computer readable storage medium according to claim 78, wherein calculating, from the second digital string, a deep-string-depth of the first digital string comprises:

calculating a value for the deep-string-depth such that the value increases as a function of at least one of an estimated amount of time or an estimated amount of energy or an estimated monetary cost expended by a sender computing device in generating the first digital string by a process including (a) generating a random digital string, (b) calculating a deep-string-depth of the generated random digital string, and (c) repeating steps (a) and (b) until the calculated deep-string depth of the generated random digital string corresponds to the calculated value and selecting the last generated random string as the first digital string.

81. A machine-implemented method, comprising:

using a hardware processor configured to accept or reject an incoming digital string by obtaining a first digital string;

transmitting the first digital string to a receiver computing device, wherein the receiver computing device performs operations comprising:

effort processing said first digital string with a predetermined cryptographic process to determine a deep-string-depth of the first digital string and to determine if the deep-string-depth satisfies a predetermined requirement of string generation effort;

accepting said first digital string and performing a first predetermined process if said effort processing determines that said deep-string-depth satisfies said predetermined requirement of string generation effort; and rejecting said first digital string and performing a different second predetermined process if said effort processing determines that said deep-string-depth does not satisfy said predetermined requirement of string generation effort.

82. The machine-implemented method according to claim 81, wherein said first digital string is generated by a process including (a) generating a random digital string, (b) determining a deep-string-depth of the generated random digital string, and (c) repeating steps (a) and (b) until a desired deep-string-depth is obtained and selecting the last generated random digital string as said first digital string.

83. The machine-implemented method according to claim 81, wherein said first digital string is obtained from a second computing device.

84. The machine-implemented method according to claim 83, wherein said the second computing device is the receiver of the first digital string.

85. The machine-implemented method according to claim 83, wherein said first digital string is purchased from a second computing device.

86. The machine-implemented method according to claim 83, wherein said first digital string is generated by said second computing device by a process including (a) determining a deep-string-depth d that a digital string is to have, (b) calculating a digital string of deep-string-depth d, and (c) applying a secret key of a public cryptosystem to the calculated digital string to generate the first digital string.

87. The machine-implemented method according to claim 81, further comprising:

obtaining, in addition to the first digital string, other digital strings associated with the first digital string; and transmitting, in addition to the first digital string, said other digital strings.

88. The machine-implemented method according to claim 87, wherein said other digital strings include a message and the address of a computing device.

89. The machine-implemented method according to claim 88, wherein said first predetermined process includes transmitting said message to address of said computing device.

90. The machine-implemented method according to claim 89, wherein said second predetermined process includes (a) not transmitting said message to address of said computing device or (b) marking said message as having failed the predetermined deep-string-depth requirement and transmitting it to the said message to address of said computing device.

91. The machine-implemented method according to claim 81, wherein said first predetermined process allows the transmitter of the first digital string access to resources controlled by the receiver computing device.

92. The machine-implemented method according to claim 81, wherein said second predetermined process does not allow the transmitter of the first digital string access to resources controlled by the receiver computing device.

93. The machine-implemented method according to claim 81, wherein said first predetermined process accepts the first digital string as payment for at least one of information, goods, or services for sale by the receiver computing device.

94. The machine-implemented method according to claim 81, wherein said second predetermined process does not accept the first digital string as payment for at least one of information, goods, or services for sale by the receiver computing device.

* * * * *